(12) United States Patent
Ansari et al.

(10) Patent No.: US 8,432,787 B2
(45) Date of Patent: *Apr. 30, 2013

(54) SOFTROUTER PROTOCOL DISAGGREGATION

(75) Inventors: Furquan Ahmed Ansari, Middletown, NJ (US); Martin Havemann, Belford, NJ (US); Tirunell V. Lakshman, Morganville, NJ (US); Thyagarajan Nandagopal, Middletown, NJ (US); Ramachandran Ramjee, Summit, NJ (US); Thomas Y. Woo, Red Bank, NJ (US)

(73) Assignee: Alcatel Lucent, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,633

(22) Filed: Nov. 7, 2011

(65) Prior Publication Data

US 2012/0281520 A1 Nov. 8, 2012

Related U.S. Application Data

(63) Continuation of application No. 11/147,472, filed on Jun. 8, 2005, now Pat. No. 8,068, 408.

(60) Provisional application No. 60/623,885, filed on Nov. 1, 2004.

(51) Int. Cl.
*G06F 11/00* (2006.01)
*H04J 3/16* (2006.01)

(52) U.S. Cl.
USPC .......................................... 370/216; 370/465

(58) Field of Classification Search .................... 370/216
See application file for complete search history.

(56) References Cited

U.S. PATENT DOCUMENTS

| 6,496,503 B1 | 12/2002 | Pelissier et al. |
| 6,633,560 B1 | 10/2003 | Albert et al. |
| 6,912,197 B2 | 6/2005 | Mahamuni |

(Continued)

FOREIGN PATENT DOCUMENTS

| EP | 1 152 631 A2 | 11/2001 |
| EP | 1 156 629 A1 | 11/2001 |

OTHER PUBLICATIONS

U.S. Appl. No. 11/147,491, filed Jun. 2005, Ansari et al.
U.S. Appl. No. 11/147,642, filed Jun. 2005, Lakshman et al.

(Continued)

*Primary Examiner* — Mark Rinehart
*Assistant Examiner* — Angel Brockman
(74) *Attorney, Agent, or Firm* — Wall & Tong, LLP

(57) ABSTRACT

A SoftRouter architecture deconstructs routers by separating the control entities of a router from its forwarding components, enabling dynamic binding between them. In the SoftRouter architecture, control plane functions are aggregated and implemented on a few smart servers which control forwarding elements that are multiple network hops away. A dynamic binding protocol performs network-wide control plane failovers. Network stability is improved by aggregating and remotely hosting routing protocols, such as OSPF and BGP. This results in faster convergence, lower protocol messages processed, and fewer route changes following a failure. The SoftRouter architecture includes a few smart control entities that manage a large number of forwarding elements to provide greater support for network-wide control. In the SoftRouter architecture, routing protocols operate remotely at a control element and control one or more forwarding elements by downloading the forwarding tables, etc. into the forwarding elements. Intra-domain routing and inter-domain routing are also included.

12 Claims, 16 Drawing Sheets

U.S. PATENT DOCUMENTS

| | | | |
|---|---|---|---|
| 7,069,343 | B2 | 6/2006 | Goringe et al. |
| 7,075,904 | B1 | 7/2006 | Manish et al. |
| 7,180,864 | B2 | 2/2007 | Basu et al. |
| 7,190,896 | B1 | 3/2007 | Wang et al. |
| 7,194,653 | B1 | 3/2007 | Hadders et al. |
| 7,197,664 | B2 | 3/2007 | Khosravi |
| 7,233,593 | B2 | 6/2007 | Chavali |
| 7,286,468 | B2 | 10/2007 | Scudder et al. |
| 7,324,439 | B2 | 1/2008 | Loo |
| 7,428,219 | B2 | 9/2008 | Khosravi |
| 8,068,408 | B2 * | 11/2011 | Ansari et al. .......... 370/216 |
| 2002/0191250 | A1 | 12/2002 | Graves et al. |
| 2003/0028641 | A1 | 2/2003 | Zhang et al. |
| 2003/0069975 | A1 | 4/2003 | Abjanic et al. |
| 2003/0185226 | A1 | 10/2003 | Tang et al. |
| 2003/0208585 | A1 | 11/2003 | Shinomiya et al. |
| 2004/0083403 | A1 | 4/2004 | Khosravi |
| 2004/0131079 | A1 | 7/2004 | Hegde et al. |
| 2004/0264384 | A1 | 12/2004 | Deval et al. |
| 2005/0047413 | A1 | 3/2005 | Ilnicki et al. |
| 2005/0050136 | A1 | 3/2005 | Golla |
| 2005/0105905 | A1 | 5/2005 | Ovadia et al. |
| 2005/0190783 | A1 | 9/2005 | Khosravi |
| 2005/0254438 | A1 | 11/2005 | Turk et al. |

OTHER PUBLICATIONS

U.S. Appl. No. 11/147,665, filed Jun. 2005, Ansari et al.
U.S. Appl. No. 11/147,768, filed Jun. 2005, Lakshman et al.
U.S. Appl. No. 11/147,937, filed Jun. 2005, Lakshman et al.
Dec. 28, 2005 Search Report in corresponding EP 05 25 6624, Lucent Technologies, Inc., Applicant.
A. Lazar, "Programming Telecommunication Networks," IEEE Network, vol. 11, Sep./Oct. 1997, pp. 8-18.
J. Rexford et al., "Network-Wide Decision Making: Toward a Wafer-Thin Control Plane," HotNets, 2004.
L. Yang et al; "RFC 3746: Forwarding and Control Element Separation (ForCES) Framework" Network Working Group, Apr. 2004, XP002323740 Chapters 1-4, 5.6.
L. Yang et al., "Forwarding and Control Element Separation (ForCES) Framework," RFC 3746, 2004.
N. Feamster, et al., "The Case for Separating Routing from Routers," Proc. of FDNA Workshop, Aug. 2004.
R Gopal: "Seperation of control and forwarding plane inside a network element" High Speed Networks and Multimedia Communications 5$^{th}$ IEEE International Conference on Jul. 3-5, 2002, Piscataway, NJ, USA, IEEE, Jul. 3, 2002, pp. 161-166, XP010603016 ISBN: 0-7803-7600-5 Chapter 2, 3, 3.1.
S. Williams, "The Softswitch Advantage," IEE Review, vol. 48, Issue 4, Jul. 2002, pp. 25-29.
T. Bates, et al., "BGP Route Reflection—An Alternative to Full Mesh IBGP," RFC 2796, Apr. 2000.
T.V. Lakshman et al., "The SoftRouter Architecture," ACM HotNets-III Workshop, San Diego, CA, Nov. 2004.
W Louati et al: "Configurable software-based edge router architecture" Applications and Services in Wireless Networks, 2004. ASWN 2004. 2004 4$^{th}$ Workshop on Boston, MA, USA Aug. 9-11, 2004, Piscataway, NJ, USA, IEEE, Aug. 9, 2004, pp. 169-173 XP010802367 ISBN: 0-7803-8960-3 Chapter III.
Ansari et al., "Element Bindings and Topology discovery Protocol—(Slides)".
Furquan Ansari et al., "ForCES Element Bindings and Topology Discovery Protocol", Jul. 2004.
Furquan Ansari, et al., "ForCES Element Bindings and Topology Discovery Protocol," Jul. 10, 2004.
J. Moy, "OSPF Version 2," Apr. 1998, IETF RFC 2328.
L. Yang et al., "Forwarding and Control Element Separation (ForCES) Framework", Network Working Group Request for Comments: 3746, Apr. 2004.
Lin et al., "Multihop Wireless IEEE 802.11 LANs", 1999 IEEE Int. Conf., vol. 3, pp. 1568-1572.
R. Gopal et al., "ForwArding and Control ElemenT protocol (FACT)", Nov. 2003, IETF Draft (draft-gopal-forces-fact-06.txt).
R. Gopal, "Separation of Control and Forwarding Plane Inside a Network Element", 2002 IEEE.
V. Chan et al., "Control Plane Platform Development Kit," Intel Developer Forum, Spring 2003.
V. Chan, et al., "Control Plane Platform Development Kit (DP-PDK)—Integrating Control Plane and Data Plane," Intel Corporation. Feb. 19, 2003.
Yang, et al. Forwarding and Control Element Separation (ForCES) Framework, RFC 3746 Apr. 30, 2004.
Furquan Ansari Thyaga Nandagopal Lucent Tech Hormuzd Khosravi Intel Corp. "ForCES Element Bindings and Topology Discovery Protocol" IETF Standard-Working Draft, Internet Engineering Task Force, IETF, CH, Jul. 10, 2004, 16 pages.
Tal Lavian et al. "Intelligent network services through active flow manipulation" Intelligent Network Workshop, 2001 IEEE May 6-9, 2001, Piscataway, NJ, USA, IEEE, May 6, 2001, pp. 73-82.
JP2005-317886 Examiner's Office Letter dated Oct. 26, 2010, 5 pages.
JP2005-318066 Examiner's Office Letter dated Nov. 15, 2010, 4 pages.
"Draft Exploration Party" Computer & Network LAN published by Ohm Publisher, on May 1, 2003, vol. 21, pp. 75-78.
RFC 3654 fORces Requirements, Khorsavi et al., Nov. 2003, All.
Aug. 5, 2011 Examiner's Refusal Decision (mailed Aug. 10, 2011) in Japanese Patent Application No. 2005-317886, Alcatel-Lucent USA Inc., Applicant, 2 pages.
Naoya Watanable et al., "method of constructing a backbone architecture of next generation computer network," p. 435-444, published on Apr. 10, 1998 by Telecommunication Association, NTT R7D Vo. 47 No. 4.

* cited by examiner

| # OF CEs | AVG. CE LOAD (# OF FEs) | AVG. DIST. FROM CE (HOPS) |
|---|---|---|
| 2 | 10 | 2.25 |
| 3 | 6.67 | 1.95 |
| 4 | 5 | 1.85 |
| 5 | 4 | 1.8 |
| 6 | 3.33 | 1.7 |
| 7 | 2.86 | 1.64 |

| SAME SHAPE | SAME NE |
|---|---|
| PRIMARY CE | ———— p |
| BACKUP CE | ------ b |
| INTERNAL LINK | ≡≡≡ |
| EXTERNAL LINK | ———— |

SOFTROUTER PROTOCOL DISAGGREGATION

CROSS-REFERENCES

The present application is a continuation of application Ser. No. 11/147,472, entitled "SoftRouterRouter Protocol Disaggregation," filed on Jun. 8, 2005 now U.S. Pat. No. 8,068,408 and claiming the benebfit of provisional application No. 60/623,885, entitled "SoftRouter: Router Disaggregation," filed Nov. 1, 2004.

FIELD OF THE INVENTION

The present invention relates generally to the field of networking and, in particular, relates to routing protocols in a deconstructed router network.

BACKGROUND OF THE INVENTION

The enormous success of the Internet has led to constant development and deployment of new features and services that have increasingly placed its technical foundations under stress. This has given credence to the notion that re-architecting the current distribution of functions in an IP network would lead to significant benefits in network stability, simplification of network operations, and flexibility in introduction of new network protocols and services.

Traditional router architectures are becoming complex. Despite the end-to-end architecture design principle that aims at a simple core network, traditional router architectures have gotten increasingly complex today. As new features are being defined in requests for comments (RFCs), more and more control plane complexity is being added at the routers. These features include routing (e.g., BGP-based MPLS-VPNs), traffic engineering (e.g., OSPF-TE), security, and the like. In fact, the code complexity of an IP router now rivals that of a telephony switch. In contrast, the forwarding path implementation has progressively become easier with rapid advances in large-scale hardware integration (e.g., ASIC) and ready availability of off-the-shelf chips.

Traditional IP networks are constructed using routers that operate relatively autonomously. The potentially unmanageable complexity is present at many points all over the network. This has many undesirable consequences. First, the multiple points of control significantly increase operational complexity (e.g., misconfiguration). Second, in certain circumstances, uncoordinated actions of these autonomous routers can lead to sub-optimal performance (e.g., poor recovery time) at best and network instability in the worst case. Finally, the introduction of new features may require upgrades to a large number of routers, which is both complex and error-prone.

Many advanced network management tasks, such as routing policy enforcement and traffic engineering would benefit significantly from the availability of a network-wide view. For instance, several common BGP-induced network stability and operations problems would be solved by moving BGP from individual routers to a single entity with autonomous system (AS)-wide scope. Similarly, many management functions require a network-wide view, without which a network can exhibit oscillation and poor stability. However, network-wide control is difficult and cumbersome to achieve in today's network of autonomous and complex routers.

Traditional router architectures have integrated control and forwarding. The control processors implementing control plane functions are co-located with the line cards that implement forwarding functions and often share the same router backplane. The control processors provide control functions only to the co-located line cards, and vice-versa, leading to a scenario where the line cards cannot be managed when there is a failure of the co-located controller(s).

In the traditional router architectures, the underlying theme is the deep intertwining of control and forwarding functions in current routers. There is a need to deconstruct routers to keep most of the network entities as dumb as possible by reducing their function to support only a few canonical packet forwarding functions and migrate all control protocols and non-forwarding related state and control processing to a few smart network-based control entities with the primary function of network-wide control.

SUMMARY

Various deficiencies of the prior art are addressed by the present invention of SoftRouter protocol disaggregation, which has many embodiments.

One embodiment is a network architecture including a first forwarding element (FE) set, a first control element (CE), and a first network element (NE). The first FE set is a number of FEs. The first CE controls the first FE set and runs one first protocol process on behalf of each FE in the first FE set. The first CE is physically remote from the FEs in the first FE set. The first CE is dynamically bound to each FE in the first FE set. The first NE includes the first CE and the first FE set.

Another embodiment is a network architecture including a number of FEs, a number of CEs, and a full internal border gateway protocol (I-BGP) mesh among the CEs. Each CE controls a different set of the FEs than the other CEs. The CEs are physically remote from the FEs. Each CE communicates with its controlled FEs using a standard protocol.

Yet another embodiment is a network architecture, including core routers, a core network connected to the core routers, forwarding elements (FEs), CEs, and a point-of-presence (POP) Ethernet network. Each CE controls more than one of the FEs. Each CE is dynamically bound to its controlled FEs. Each CE is physically remote from its controlled FEs. Each CE communicates with its controlled FEs via a standard protocol. The POP Ethernet network is connected by the core routers to the core network, connected to the CEs, and connected to the FEs.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
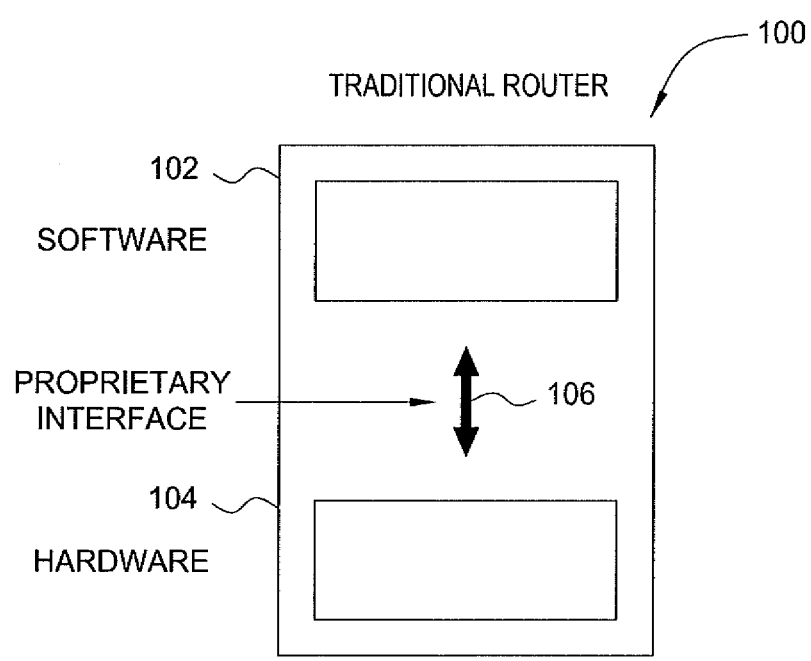
FIG. 1 is a block diagram showing a traditional router.

The invention will be primarily described within the general context of an embodiment of an exemplary SoftRouter architecture, however, those skilled in the art and informed by the teachings herein will realize that the disaggregation concept may be used to generate various other embodiments of network architectures and that the invention is applicable to local area networks (LANs), metropolitan area networks (MANs), wide area networks (WANs), and other networks, many open systems interconnection (OSI) layers, gateway protocols, serial line protocols, protocol stack routing and bridging protocols, many other protocols, traffic management, optical, edge/core routing, wireless, cable, data centers, auxiliary signal path (ASP), fault management, configuration management, accounting management, performance management, security management, other network management, enterprise, government, military applications, and many other different kinds of networking characteristics and applications.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

Architecture Overview

An embodiment of an exemplary SoftRouter architecture deconstructs routers by separating the implementation of control plane functions from packet forwarding functions. Other embodiments of network architectures that achieve this deconstruction are also within the scope of this invention. The present invention encompasses the concept of this deconstruction and its implications for network architecture. In the exemplary SoftRouter architecture, all control plane functions are implemented on separate control entities that are not required to be co-located with the forwarding engines. By migrating all non-forwarding related state and control processing to a few network-based control entities, simpler implementation of network-wide objectives are possible, because coordinated configuration changes are required at only a few smart network elements, instead of all the network elements in an AS. In addition, the association between controllers and the forwarding engines is dynamic, allowing flexible control of a forwarding engine by any control entity that is capable of doing so.

The exemplary SoftRouter architecture includes a dynamic binding protocol for establishing and maintaining dynamic bindings between forwarding entities and the control entities in the network. Intra-domain and inter-domain routing is adapted in the exemplary SoftRouter architecture with improved performance, including improved performance for the intra-domain protocol OSPF.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An exemplary embodiment of an exemplary SoftRouter architecture is an approach to disaggregating the complex IP functions demanded by emerging applications. SoftRouter centralizes and allows sharing of complexity. SoftRouter enables scalable introduction of new functions without unduly encumbering IP forwarding functions.

FIG. 1 shows a traditional router 100 having integrated control and transport planes. The traditional router 100 has software 102 and hardware 104 communicating through a proprietary interface 106.

Figure 2:
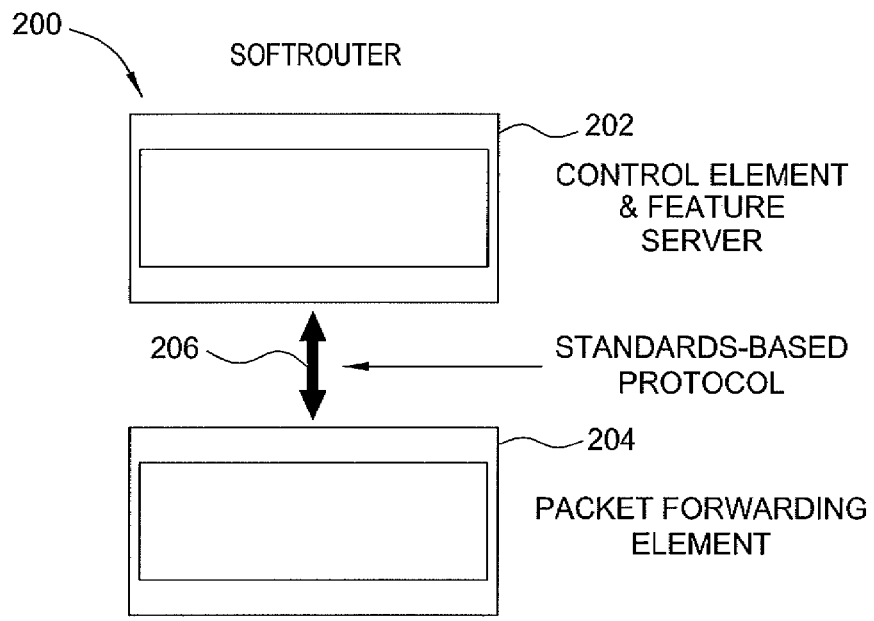
FIG. 2 is a block diagram showing a high level abstraction of an exemplary SoftRouter architecture.

By contrast, FIG. 2 shows a high level abstraction of an exemplary SoftRouter architecture 200 that disaggregates the control and transport planes in separate hardware that communicate using standard protocols. The SoftRouter architecture 200 has a control element and features server component 202 and a packet forwarding element component 204 that communicate using a standards-based protocol 206.

Figure 3:
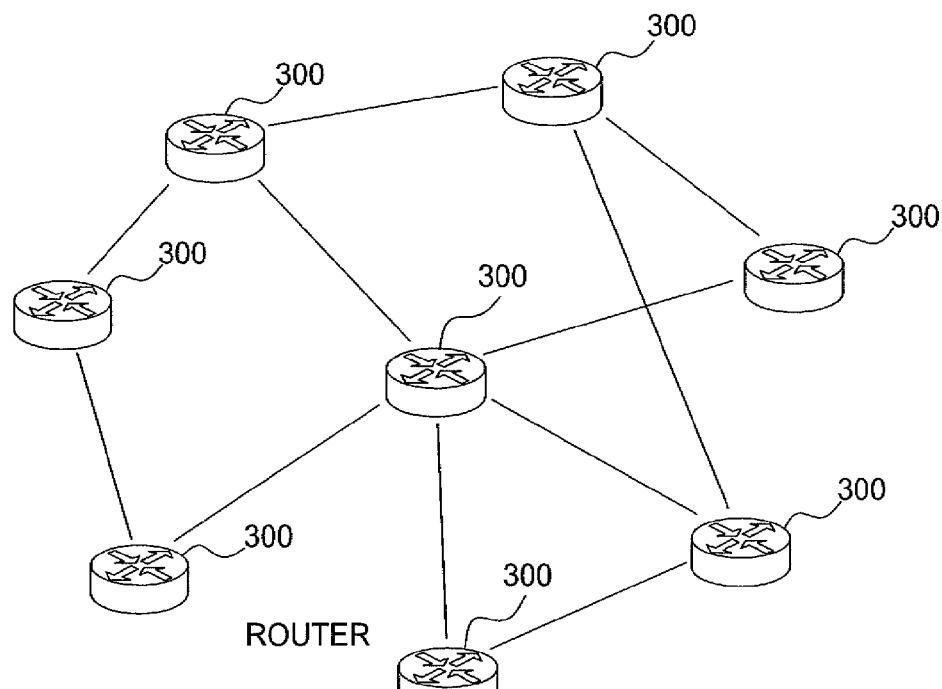
FIG. 3 is a block diagram showing a traditional router architecture.

FIG. 3 shows the traditional router architecture, which has a number of interconnected routers 300.

Figure 4:
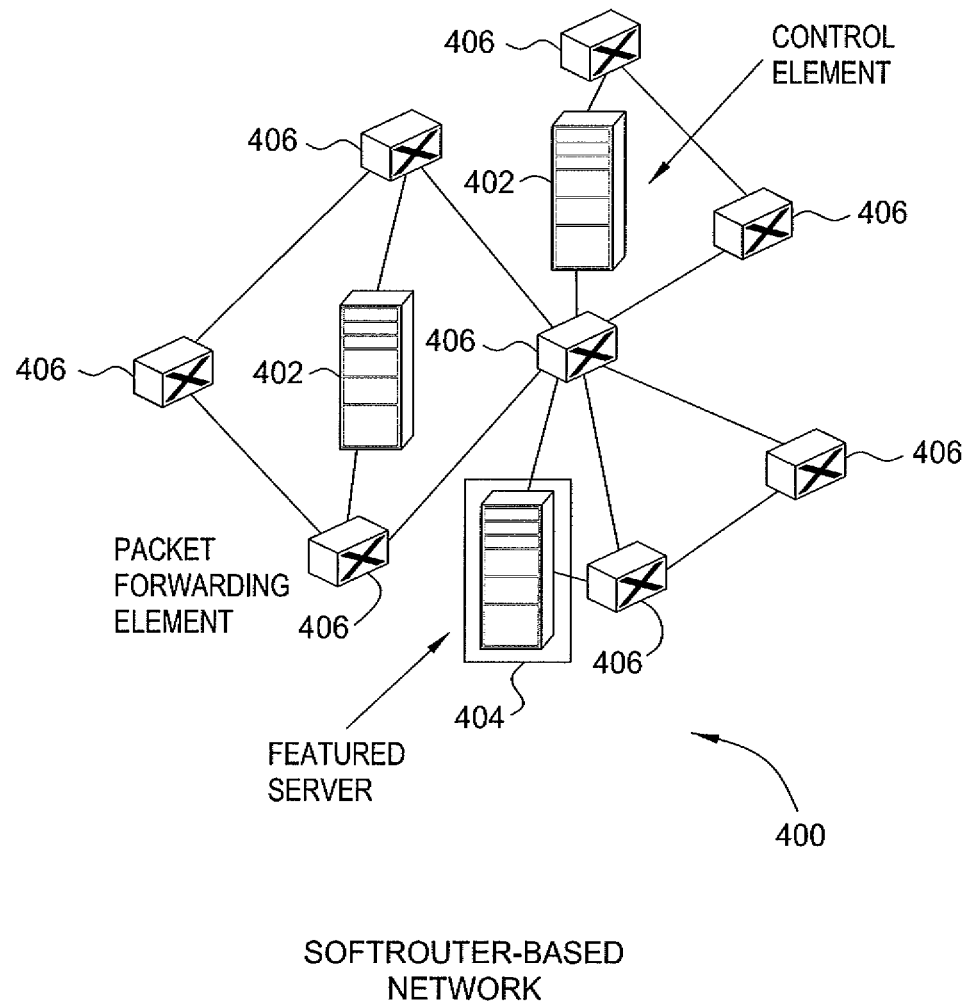
FIG. 4 is a block diagram showing an embodiment of the exemplary SoftRouter architecture.

FIG. 4 shows an embodiment of the exemplary SoftRouter architecture 400. In this embodiment of the exemplary SoftRouter architecture 400, the software servers include control elements (CEs) 402 and feature servers (FSs) 404. CEs 402 are responsible for traditional routing, e.g., for both interior gateway protocol (IGP) (e.g., open shortest path first (OSPF)) and exterior gateway protocol (EGP) (e.g., border gateway protocol (BGP)). FSs 404 are responsible for value-added functions and network-based applications, e.g., QoS, VPN, and mobile IP. Both CEs 402 and FSs 404 interface to forwarding elements (FEs) 406. CEs 402 and FSs 404 may have additional interfaces to each other. The exemplary SoftRouter architecture separates and centralizes the software-based route controller (SoftRouter) from hardware-based transport and packet forwarding.

Deconstructing routers in the exemplary SoftRouter architecture separates the control and forwarding functions. This separation is more than logical (e.g., the use of a well-defined interface with a modular application programming interface (API)); in fact, the control is physically separated (i.e., executed in a distinct network element) by multiple hops from where the forwarding is performed.

Network Entities

A FE 406 is a network element that performs the actual forwarding and switching of traffic. In construction, a FE 406 is similar to a traditional router in that it may have multiple line cards, each in turn terminating multiple ports, and a switch fabric for shuttling data traffic from one line card to another. However, a FE 406 is different from a traditional router, because there is an absence of any sophisticated control logic (e.g., a routing process like OSPF or BGP) running locally. Instead, the control logic is hosted remotely.

A CE 402 is a general purpose computing element, such as a server. It connects to the network like an end host, except that it is typically multi-homed to the network via multiple FEs 406, so that it is not disconnected from the network when a single link fails. A CE 402 runs the control logic on behalf of FEs 406 and, hence, controls them. Any control logic typically found on a traditional router can be migrated to the CEs 402, including routing protocols like OSPF and BGP as well as protocols such as resource reservation protocol (RSVP), label distribution protocol (LDP), Mobile IP, and the like.

An FE 406 functions to forward data traffic between its links. This function may take various forms, such as packet forwarding, label switching, and optical switching, among others. Packet forwarding includes both layer 2 (medium access control (MAC)-based switching) and layer 3 (longest-prefix match) forwarding. Label switching includes, for example, MPLS forwarding. The data-path forwarding functions can include label-swapping, pushing, and popping. In optical switching, the traffic can be time-switched, wavelength-switched, or space-switched among the links. In each of these cases, the switching function is driven by a simple local table that is computed and installed by a CE 402 in the network. Thus, the ability of a FE 406 to do its work based only on a local data structure means the FE 406 is designed to be dumb and fast, while the more complex logic is relegated to a remote, yet smart CE 402.

Both FEs 406 and CEs 402 are understood as logical entities, in addition to physical network elements. Specifically, a FE 406 is logically defined as a collection of ports where traffic can be switched among one another. For example, a FE 406 may include all ports on a single line card, in which case the whole physical packet switch is made up of multiple logical FEs 406. An FE 406 can also span more than one physical switch; however a CE can control multiple FEs. Similarly, a CE 402 can be understood as a logical process instantiated for providing control on behalf of FEs and can be distinguished from the server machine that actually executes it. In particular, a physical CE server machine (PCE) can host multiple CE 402 processes, each serving a different collection of FEs 406. Vice-versa, it is also possible for multiple CE 402 processes (each instantiated for a different control purpose such as interior gateway protocol (IGP) and exterior gateway protocol (EGP)) serving the same FE 406 to be hosted on distinct PCEs. The physical and logical definitions of FEs 406 and CEs 402 are used interchangeably.

Figure 5:
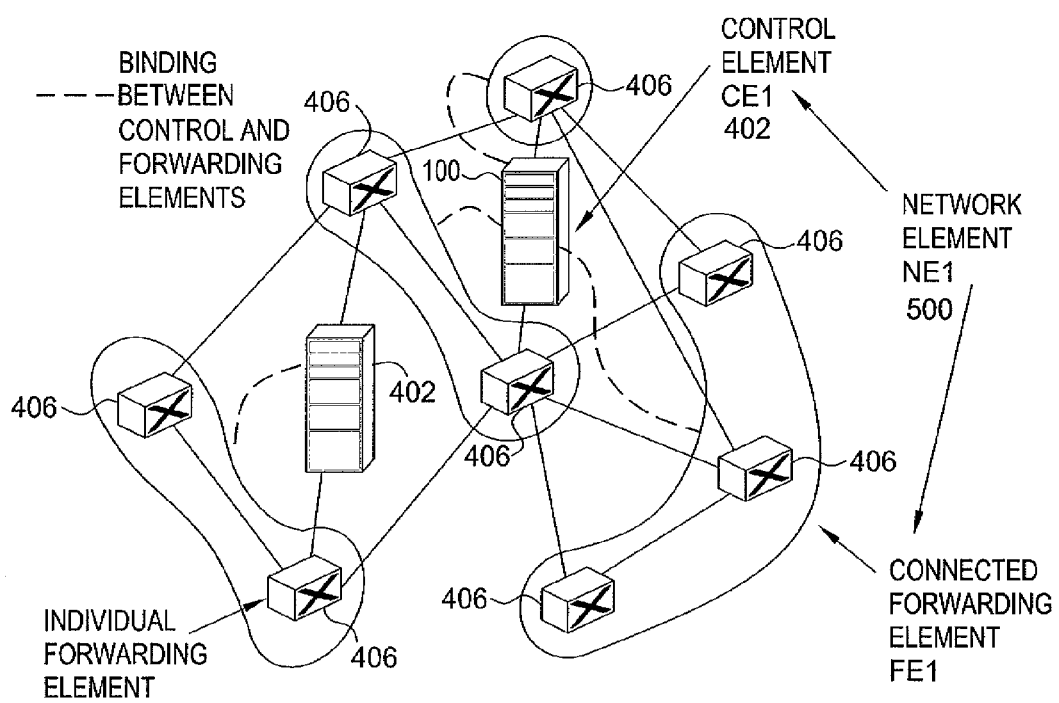
FIG. 5 is a block diagram showing an embodiment of the exemplary SoftRouter architecture illustrating network elements.

FIG. 5 shows an embodiment of the exemplary SoftRouter architecture illustrating network elements 500. Although the notion of a router is not strictly needed in the exemplary SoftRouter architecture, it is useful to regain some equivalent notion in order to understand the routing view of a network. To this end, the concept of a network element (NE) 500 is defined at a high level as a logical grouping of FEs 406 and the respective CEs 402 that control those FEs 406. A particular NE 500 grouping implicitly classifies each link between FEs as either internal (or intra-NE) or external (or inter-NE). An internal link connects two ports belonging to the same NE 500 and an external link connects two ports belonging to different NEs 500. The concept of NE 500 is useful when intra-NE and inter-NE routing follow different approaches.

Without additional restrictions, the above definition of NE 500 allows flexibility. For example, this definition allows two FEs 406 in disjoint parts of a network to belong to the same NE 500. It also allows for a traditional router model where the FE 406 includes exactly all the ports in the physical element and the controlling CE(s) 402 are collocated on the same element.

In clustered routing, the FEs 406 making up a NE 500 are part of a contiguous cloud. In other words, all ports of the NE 500 are reachable from each other via links internal to the NE 500. Physically, this represents the clustering of neighboring physical FEs 406 into a single NE 500. A typical scenario is that of several routers being connected back-to-back in a central office. From a routing perspective, this clustering-based definition of the NE 500 can provide significant simplification. The reduced number of NEs 500 in the routing view reduces the inter-NE routing complexity and a different, possibly less complex routing protocol can be employed for intra-NE routing.

The control relationship between an FE 406 and a CE 402 is formally called a binding. More precisely, a binding between a FE 406 and a CE 402 means that the CE 402 is performing particular control functions on behalf of the FE 406. Because multiple protocols (e.g., IGP and EGP, or even multiple instances of a protocol) may be required for the operation of a FE 406, a FE 406 may have multiple CE 402 bindings.

Protocols

The exemplary SoftRouter architecture includes various protocols. A number of different protocols are used for the operation of a network designed according to the exemplary SoftRouter architecture, including dynamic binding protocol and FE/CE transport protocol. The binding between a FE 406 and a CE 402 is established via a protocol that discovers CEs 402 and FEs 406 and also maintains these bindings in the face of network disruptions. In the most general case of the dynamic binding protocol, an FE 406 can bind to any available CE 402 and a CE 402 can perform control functions for any FE 406, thus yielding maximal resiliency and minimal configuration overhead. This dynamic binding ability is a feature of the concept of deconstructed routers that have separate control and forwarding functions. The FE/CE transport protocol has two parts, namely data and control. For the data part, the FE/CE transport protocol supports tunneling of routing protocol packets between FEs 406 and CEs 402 so that a routing protocol packet received by an FE 406 can be sent to a CE 402 for processing. For the control part, once a binding is established, the FEs 406 and the CEs 402 use the FE/CE transport protocol to communicate state information and perform control. On the uplink (FE 406 to CE 402)

direction, this control part provides link and forwarding state information (e.g., link up/down signal) to the CE 402. On the downlink direction, the FE/CE transport protocol carries configuration and control information (e.g., enable/disable a link, forwarding information base (FIB)). Known protocols, such as forwarding and control element separation (ForCES) may be used for the FE/CE transport protocol.

Some Features

The exemplary SoftRouter architecture includes two features: dynamic binding and varying degree of distributed control. In the exemplary SoftRouter architecture, a FE 406 can dynamically bind to any CE 402 on the network at any time and vice-versa. This provides an increased degree of freedom in the design and deployment of the control plane that, in turn, leads to improvement in resiliency, operational complexity, scalability, management, and security. In contrast, the static bindings in the traditional model make it less reliable and less flexible with respect to redesigning the Internet control plane. Distributed control provides benefits such as resiliency, but can also lead to certain network instabilities. For example, the use of route reflectors in BGP can have oscillation problems and flooding-based link-state protocols, such as OSPF can cause update storms due to multiple failures. The exemplary SoftRouter architecture allows a varying degree of distributed control. Specifically, embodiments of the exemplary SoftRouter architecture implement different degrees of distributed control by varying how FEs 406 are clustered and how control is aggregated on the CEs 402. Fewer control points mean higher vulnerability to failure conditions such as network partitioning, but potentially better network stability. Both traditional fully distributed routing and completely centralized routing are merely two extreme implementations of many possible embodiments of the exemplary SoftRouter architecture.

Dynamic Control Binding

The dynamic binding feature of the exemplary SoftRouter architecture allows for a FE 406 to be separated by multiple hops from a CE 402. This flexibility comes at the expense of increased complexity in the initial configuration of the forwarding elements. In the SoftRouter model, upon bootup, the FE 406 obtains its configuration information, including the IP addresses of its interfaces from a remote CE 402 that resides on a server. This poses a potential paradox: in order to discover a CE 402 and send packets to it, the FE 406 requires routing information; however, the routing information is supposed to come from the CE 402. This paradox is resolved using a discovery protocol that is part of the exemplary SoftRouter architecture. This discovery protocol lets FEs 406 and CEs 402 discover each other and maintain a routable path between these entities, which is not based on IP routing. The dynamic binding process also supports enhanced features, such as CE 402 load balancing, constrained clustering algorithms that improve CE-FE binding resiliency and failover, increasing the availability for the network. These features also enable better network planning and better network-wide control.

Dynamic Binding Protocol

Embodiments of the dynamic binding protocol provide binding service for FEs 406 and routing services for FE-CE messages. The dynamic binding protocol runs continuously on all the elements (FEs 406 and CEs 402) for the lifetime of the network as a separate protocol, independent of other protocols that operate in the network. At the minimum, each FE 406 and CE 402 has a pre-configured octet string (FEID/CEID) that acts as a unique identifier. The dynamic binding protocol is transport independent and may operate on layer 2 or layer 3 networks. For example, it may run in an Ethernet network or FEs 406 and CE 402 using layer 2 bridging with the rapid spanning tree protocol for loop avoidance. In heterogeneous networks, the discovery protocol may use layer 3 addressing with source routing or bridging. The dynamic binding protocol has four components: discovery, association, failure detection with failover, and transport tunnels.

Discovery

The discovery component of the dynamic binding protocol enables a FE 406 to discover a CE 402 that can manage it. This CE 402 is called the managing-CE for that FE 406. In order for the discovery component to provide rapid discovery for the configuration process, CE 402 reachability information is distributed to each FE 406. A newly booted FE 406 just queries its neighbors to obtain the reachability information to all CEs 402 in the network. To distribute CE 402 reachability information, FEs 406 periodically broadcast solicitation messages to their neighbors. If a neighbor is a CE 402, it responds by advertising its identity. If a neighbor is a FE 406, it responds with the reachability information to all already learned CEs 402. For source routing, the reachability information includes, besides CE 402 identities, the source routes to reach the CEs 402 and a time-to-live parameter indicating the freshness of the information.

For source routing, FEs 406, need to know their neighbors. On reception of a CE 402 advertisement or a FE 406 reachability message from a neighbor, the FE 4065 adds the neighbor FEID or CEID to the received source routes. CEs 402 derive source routes to FEs 406 by reversing the source route in received packets. (FEs 406 always initiate the very first packet exchange with CEs 402.) Neighbors advertise themselves by periodically sending hello messages on all discovery protocol enabled interfaces. Each node (FE/CE) thus maintains a list of neighbors when hello messages are not any longer received.

For a discovery process using IP addressing, at the time of bootup, each FE 406 uses a randomly chosen temporary IP addresses for its interfaces along with the FEID to perform pre-configuration source routing. These IP addresses are chosen from a controlled address space, for example a private subnet address pool, like 10.x.x.x. The CEs 402 are pre-configured and, hence, have a valid IP addresses. All messages use IP limited broadcasts or multicasts to allow packet exchange between IP addresses of different subnets, which is common in the transitional phase of peering unconfigured FEs 406 and configured FEs 406 or CEs 402. IP addressing is only used to exchange packets with direct neighbors. Therefore, temporary IP addresses have only to be unique on a per link basis.

Each FE 406 is assigned one primary-CE and at least one backup-CE by the network administrator during network planning. This information is configured in the CEs 402 and, optionally, in the FEs 406. Typically, this assignment is made a priori by taking into account factors, such as the load on the CE 402, the distance between the CE 402 and the FE 406, and the reliability of the links between them.

The association process strives to establish and maintain an active association between an FE 406 and its primary-CE and backup-CEs. The managing-CE is chosen by the FE 406 from the list of associated CEs 402, with the primary-CE preferred at all times to other CEs 402. FEs 406 dynamically associate with the best CE 402 using bindings that are either pre-configured by the network administrator or obtained using distributed clustering algorithms. A FE 406 associates with a CE 402 by sending an association message. The CE 402 accepts the FE 406 if it can manage it or rejects it. If known to the CE 402, the rejection may optionally contain the IDs of primary-CEs and backup-CEs for the FE 406. If not accepted, the FE 406 either proceeds to contact its primary-CE or backup-CE or continues to search for them by contacting other CEs 402.

Failure Detection and Repair

The dynamic binding protocol has mechanisms to detect and repair CE 402 failures. Once an association is made between the FE 406 and a CE 402, the liveness of the association is probed periodically through heartbeat messages initiated by the FE 406. When heartbeat messages do not elicit any responses from the CE 402, it implies that either the path to the CE 402 is no longer valid or that the CE 402 node is no longer alive. A FE 406 then fails over to one of its backup-CEs by sending an activate message. The backup-CE acknowledges the activate message and is then the managing-CE. A CE 402 cannot dis-associate from a CE 402 without acknowledgement from the FE accepting the change. This is also true for a FE 406 desiring to change its managing-CE so long as the current managing-CE is still alive.

Transport Tunnels

The dynamic binding protocol sets up a rudimentary transport tunnel between a FE 406 and its associated CEs 402, called the slow-path (i.e., a source routed or bridged path that is not necessarily the shortest path) and allows higher layer protocols (e.g., OSPF) CE-FE communication when all other communication means fail. These tunnels are unreliable and do not guarantee in-sequence delivery. These slow-path tunnels are used only rarely, when there are no valid routing tables installed on the FEs 406, for example, when the FE 406 is being initialized or when the FE 406 is switching to a different managing-CE.

The combination of these four components helps the dynamic binding protocol to actively discover and maintain dynamic bindings between FEs 406 and CEs 402 in the network.

Load Balancing, Clustering, and Failover

The dynamic binding protocol allows for dynamic binding between a CE 402 and a FE 406 that are separated by multiple hops. This gives the FE 406 and the CE 402 a wide array of choices in determining their managing-CE and the managed-FE-set respectively. Various design choices may be made depending on whether there is any benefit in imposing a structure to these choices and, if so, the criteria that are to be used. Regulating these choices enables deterministic behavior in the network, greater control in the hands of the network administrator, and better planning of the network. Given these benefits, the following criteria are used to allot an FE 406 to be managed by a given CE 402: the load on a given CE 402 in terms of the number of FEs 406 managed, the average distance (in hops) between an FE 406 and its managing-CE, and how failover can be performed quickly without adversely affecting the load on a CE 402. These criteria are addressed in the context of the network planning, where the designer selects the locations where a given number of CEs 402 are located.

CE Placement

To design an embodiment of the exemplary SoftRouter architecture, it is desirable to place k CEs 402 in a network of FEs 406 such that (1) the load is balanced across the k CEs 402 and (2) the mean distance between each FE 406 and its associated CE 402 is minimized. An initial assumption is that there are no restrictions on where to place the k CEs 402 and that the FEs 406 can be assigned to be managed by any CE. The load of FEs 406 across the set of primary-CEs is balanced, while simultaneously minimizing the mean distance between an FE 406 and its primary-CE. Links may have different delay or failover characteristics and the locations of the CEs 402 are chosen. It is desirable not to have any CE server overloaded as far as possible. It is also desirable to minimize the average distance between a FE 406 and its primary-CE in order to reduce the communication latency, which allows routing protocols executing on the CE 402 to be notified of failures quickly. In addition, if the FE 406 is closer to its primary-CE, the discovery process converges faster. Thus, if all CEs 402 are equally capable, then a division of the FE network into clusters of nearly equal sizes will achieve these dual goals of load balancing and minimizing average distance between the managing-CE and the FE 406.

In this k-way equipartition problem, the goal is to divide a graph into clusters of equal sizes, while minimizing the weights of the edges within each cluster. This optimization problem is known to be NP-complete. There are near-optimal solutions to this problem based on realizations that complete in polynomial time, but without strict bounds on the approximations. In recursive graph bisection, a k-way split is obtained by recursively partitioning the graph into two subgraphs, where one of the subgraphs is set to be of size [n/k]. Recursive graph bisection works reasonably well, when the network is well-connected.

Figure 6:
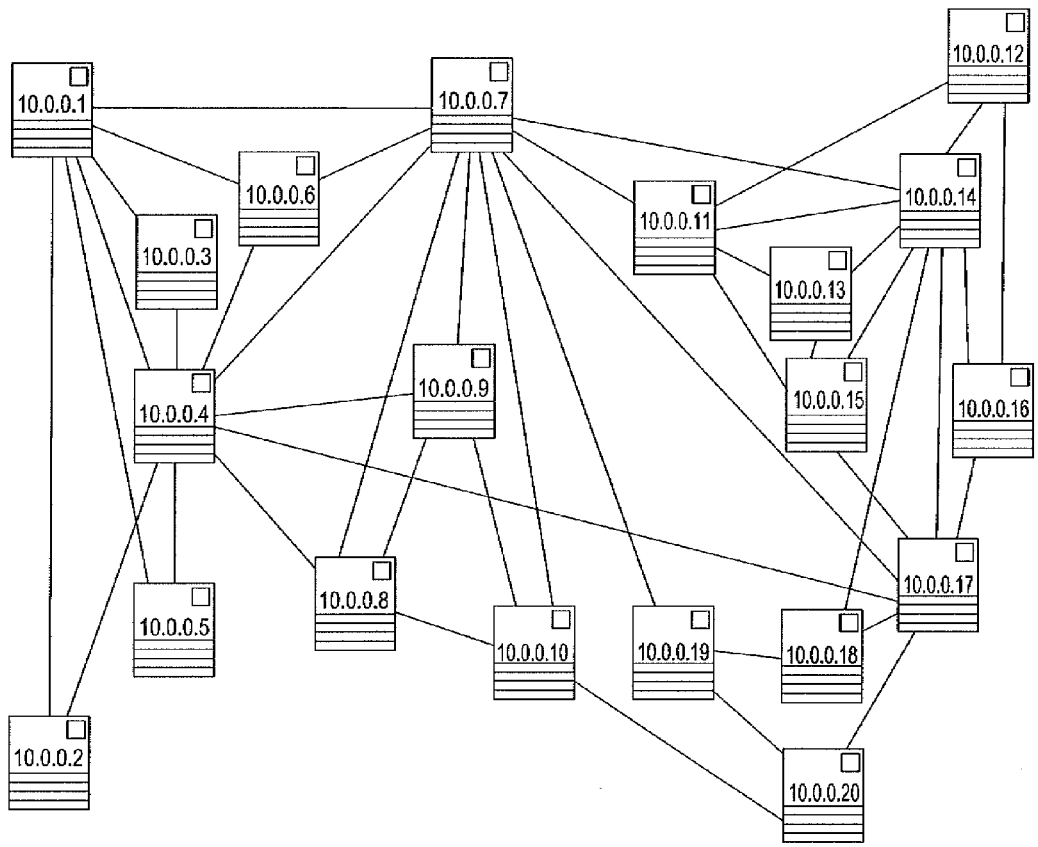
FIG. 6 is a block diagram showing recursive bisection as used on a typical Tier 1 point-of-presence (POP)-level Internet service provider (ISP) topology with 20-nodes and 44-links.

FIG. 6 shows recursive bisection as used on a typical Tier 1 POP-level ISP topology with 20-nodes and 44-links. The diameter of this network is 4. The number of CEs 402 is varied from 2 to 7 and the results are presented in the table in FIG. 7 based on the number of FEs 406 per CE cluster and the distance of FEs 406 from their managing-CE. The CEs are connected to a single FE 406. If a CE 402 has direct links to multiple FEs 406, then the distance metrics reduce further.

Failover

CE 402 failover occurs when the association between the FE 406 and its managing-CE times out. This can happen either because the managing-CE is down or if an FE 406 is unable to discover a valid path to the managing-CE to exchange heartbeats. CE failover is then performed, with the FE switching to another associated CE 402, if any. The new CE 402 then becomes the new managing-CE.

Failover needs to occur with minimal delay. Hence, it is determined which CEs 402 are designated as backup-CEs for a given FE 406. An FE 506 can have more than one backup-CE with an order of preference among them. In an embodiment of the exemplary SoftRouter architecture, the criteria for selecting backup-CEs include a minimal failover time.

The backup-CEs are chosen such that each backup-CE has the least mount of path overlap with the previous backup-CE and the primary-CE. The path from the primary-CE to the FE 406 preferably has minimal overlap with the path from the FE 406 to the chosen backup-CE. Similarly, the second backup-CE is chosen such that its path to the FE 406 has the least overlap with the shortest paths from the FE 406 to both the primary-CE and the first backup-CE. A goal is to ensure that connectivity is maintained even in the presence of multiple link or CE/FE failures.

A FE 406 that is using a backup-CE always tries to re-associate with its primary-CE and switch to it when conditions permit. This ensures that the load on all CEs 402 remains fairly equal, as decided by the load-balancing algorithm.

Prototype Implementation

Figure 7:
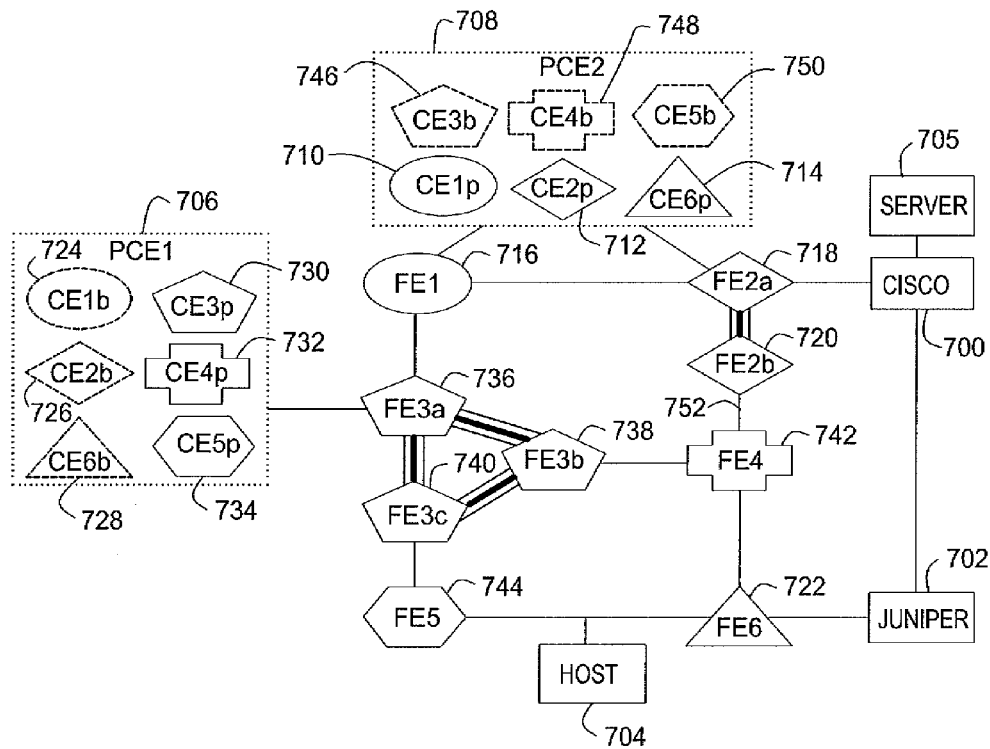
FIG. 7 is a block diagram of an exemplary prototype testbed.

FIG. 7 is a block diagram of an exemplary prototype testbed. To verify the feasibility of the exemplary SoftRouter architecture, a prototype implementation was done in a testbed with a mix of commercial routers and PCs acting as FEs 406 and CEs 402. The testbed includes 6 NEs 500 (each NE is indicated by components having the same shape in FIG. 8), a Cisco™ 7200 router 700, a Juniper™ M-20 router 702, a host PC 704, a server PC 705, and a network monitor PC (not shown), all interconnected via Ethernet. Each NE 500 includes at least one or more FEs 406 connected to a primary-CE and a backup-CE. The FEs 406 are preconfigured to choose their specific primary-CE and backup-CE. During normal operation, the primary-CE is selected as the managing-CE. The primary-CE and backup-CE of an NE 500 are hosted on two different PCEs, PCE1 706 and PCE2 708. Each PCE is representative of a cluster of high performance control servers, but is implemented as a single server in the testbed for simplicity.

Primary-CEs (i.e., CE1*p* 710, CE2*p* 712, CE6*p* 714) are hosted on PCE2 708 and control FE1 716 {FE2*a* 718, FE2*b* 720} and FE6 722 respectively. The corresponding backup-CEs (i.e., CE1*b* 724, CE2*b* 726, CE6*b* 728) are hosted on PCE1 706. Primary-CEs (i.e., CE3*p* 730, CE4*p* 732, CE5*p* 734) are hoisted on PCE1 706 and control FEs 406 {FE3*a* 736, FE3*b* 738, FE3*c* 740}, FE4 742, and FE5 744 respectively. The corresponding backup-CEs (i.e., CE3*b* 746, CE4*b* 748, CE5*b* 750) are hosted on PCE2 708.

The testbed topology accommodates three types of NEs 500: (1) CE 402 and FEs 406 of a NE 500 with at least one direct link (i.e., NE1, NE2, NE3); (2) CE 402 and FEs 406 of an NE 500 separated by more than one hop between the CE 402 and the FE 406 (NE4, NE5, NE6).

Three experiments were designed to evaluate the dynamic binding protocol behavior of the prototype. Experiment one determines, for the case of a network-wide boot, the duration until all CE 402 information is propagated throughout the network. Experiment two measures the source route convergence time for the case of a link and node failure. Experiment three measures the failover time to the backup-CE when the managing-CE fails. Network events are time stamped locally on the FEs 406 and transmitted to the network monitor PC (not shown). All FEs 406 are time synchronized via network time protocol (NTP) to correlate network events. For each experiment, three measurements were taken and averaged. All measured times are in seconds.

EXPERIMENT ONE

In experiment one, the dynamic binding protocol was initiated on all CEs 402 and FEs 406 simultaneously. The CE 402 propagation duration is the time taken for the last FE 406 to learn about all CEs 402 and is shown in Table 1.

TABLE 1

Network-wide boot for experiment one.

| Time to learn(s) | FE | | | | | | | | |
|---|---|---|---|---|---|---|---|---|---|
| | 1 | 2a | 2b | 3a | 3b | 3c | 4 | 5 | 6 |
| 1$^{st}$ CE | 1.1 | 1.0 | 2.2 | 0.8 | 2.2 | 2.5 | 3.1 | 4.7 | 4.6 |
| All CEs | 3.9 | 6.0 | 6.8 | 3.2 | 5.3 | 5.4 | 4.7 | 7.5 | 8.3 |

The results show that the CE 402 information seeded on PCE1 706 and PCE2 708 eventually reach all the FEs 406, propagating in two overlapping waves. FE1 716, FE3*a* 736, and FE4 742 are the first nodes where both waves intersect, thus making these nodes the first nodes to be aware of all the CEs 402 in the network.

EXPERIMENT TWO

Experiment two studies the impact of link and node failures on the convergence time of the dynamic binding protocol. The link FE2*b*-FE4 752 was first disconnected and reconnected. Upon disconnection, FE4 742 discovered the link failure and adjusted its source routes with information propagated by FE3*b* 738. This information was then passed on to FE6 722. After reconnection, FE4 742 received shorter route information to CEs 402 on PCE2 708 from FE2*b* 720 and propagated it to FE6 722. Table 2 shows the source route convergence times.

TABLE 2

Source route convergence times after failure (F)/recovery (R) events for experiment two.

| Event | FE | | | | | | | |
|---|---|---|---|---|---|---|---|---|
| | 1 | 2a | 3a | 3b | 3c | 4 | 5 | 6 |
| Link(F) | | | | | | 2.0 | | 4.7 |
| Link(R) | | | | | | 2.9 | | 6.0 |
| Node(F) | | 1.3 | 9.1 | 7.8 | 9.5 | | 8.5 | |
| Node(R) | 5.7 | 5.6 | 6.0 | 7.4 | 7.3 | | 9.5 | |

For node failure, the node FE1 716 is stopped. Upon node failure, FE2*a* 718 and FE3*a* 736 discover first that FE1 716 is down. They remove all source routes involving FE1 716 and stop propagating such information. Their neighbors discover the invalid routes in the next propagation cycle and remove them from their source route tables. In parallel, the longer alternative routes to primary-CEs and backup-CEs on PCE1 706 and PCE2 708 are selected. FE3*a* 736, FE3*c* 740, and FE5 744 are the last nodes converging, because they learn about new routes to their backup-CEs only through information seeded by FE4 742. A similar pattern is observed when node FE1 716 is restarted, with nodes FE1 716, FE2*a* 718, and FE3*a* 736 converging first, followed by FE3*b* 738, FE3*c* 740, and FE5 744 that are two and three hops away from FE1 716. The convergence times indicate the time taken to learn about all of the CEs 402 in the network.

EXPERIMENT THREE

In experiment three, for the failover scenario, the CE3*p* 730 process is terminated, which causes a heartbeat timeout on FE3*a* 736, FE3*b* 738, and FE3*c* 740. Each FE 406 detects the timeout independently and switches to CE3*b* 746. The average time between the timeout and backup-CE activation is 0.8 s for FE3*a* 736, 1 s for FE3*b* 738, and 1.1 s for FE3*c* 740.

While the dynamic binding is taking place in the background upon link or CE/FE failures, forwarding still takes place in the network based on FIBs installed by the corresponding managing-CEs. When fault detection by higher layer routing protocols, such as OSPF is not instantaneous, the convergence times achieved by the dynamic binding protocol are smaller than the convergence times of higher layer routing protocols. Thus, the dynamic binding protocol does not have a detrimental effect on the rest of the network routing behavior in most cases.

Various embodiments of the present invention address the following technical challenges: protocol aggregation, high reliability, and the bootstrapping paradox. There are methods for how protocols like OSPF/BGP operate when a single protocol instantiation at the CE server manages multiple FEs, how to decide where the CE servers should be placed, and how to determine which CE servers manage which FEs. The bootstrapping paradox is also a kind of chicken and egg problem in that the FE needs updated forwarding tables in order to route packets to its CE server, but only the CE server can update the forwarding tables.

Routing Protocols

Routing protocols operate in the deconstructed router network, such as an embodiment of the exemplary SoftRouter architecture. Routing protocols operate remotely at the CE 402 and control one or more FEs 406 by downloading the forwarding tables and other information onto the FEs 406. The exemplary SoftRouter architecture includes both intra-domain routing and inter-domain routing protocol realization.

Intra-domain Routing

Figure 9:
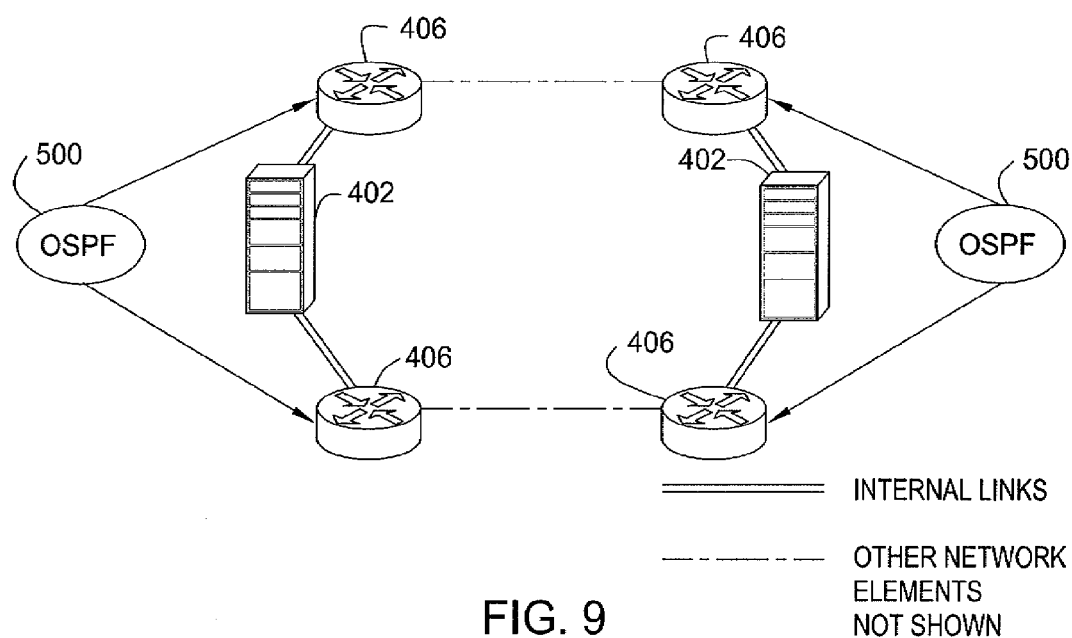
FIG. 9 is a block diagram showing an embodiment of the exemplary SoftRouter architecture where each control element (CE) runs an OSPF instance on behalf of multiple forwarding elements (FEs)
Figure 10:
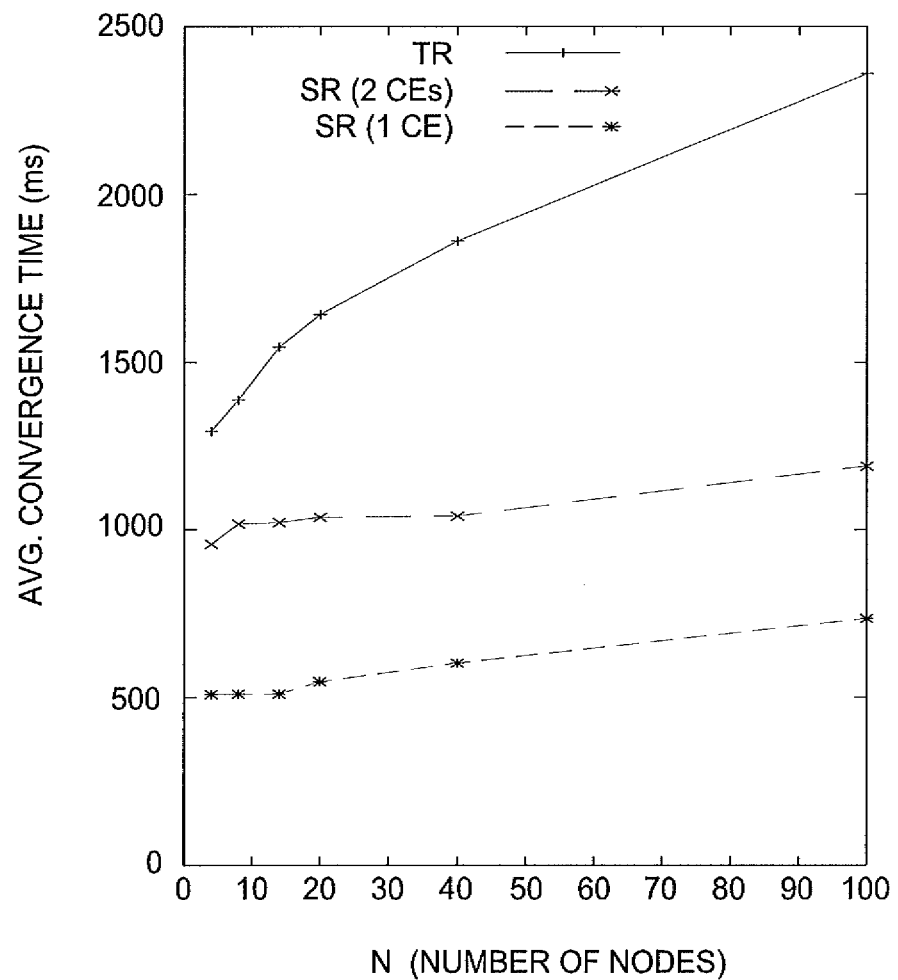
FIG. 10 is a chart showing experimental average convergence time versus the number of nodes in a ring topology.

Intra-domain routing protocols, such as OSPF are migrated to the exemplary SoftRouter architecture. OSPF is a link state protocol that enables each router executing it to maintain an identical link state database describing the topology of the entire network, by reliably flooding link state advertisements (LSAs) to its neighbors. FIGS. 9 and 10 highlight the differences between OSPF protocol execution in the traditional router architecture and the exemplary SoftRouter architecture.

Figure 8:
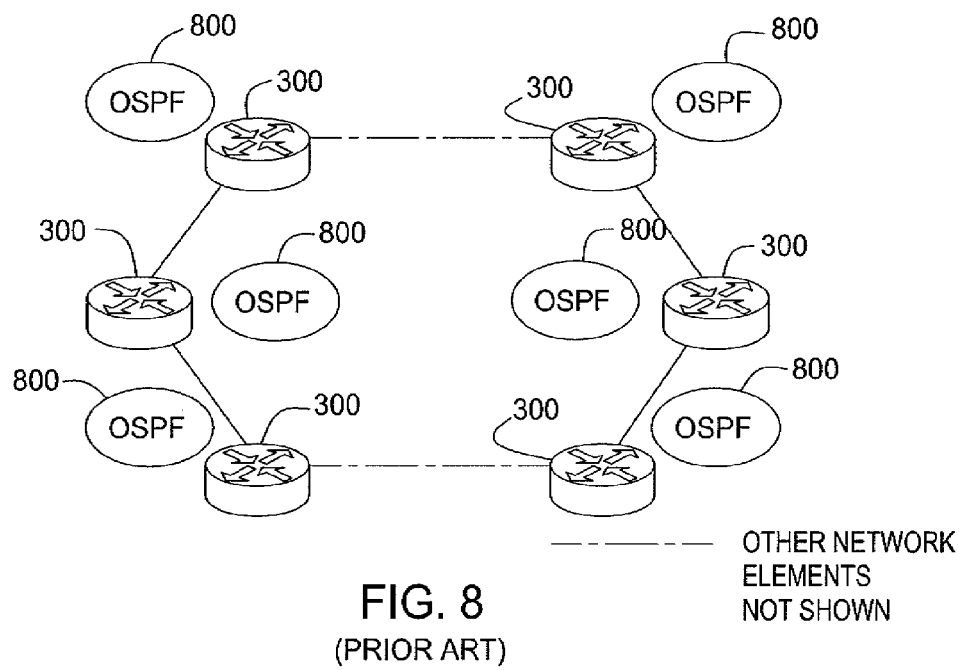
FIG. 8 is a block diagram showing a prior art network, where each router runs an open shortest path first (OSPF) instance that maintains its own link state database (LSDB)

FIG. 8 shows a prior art network where each router 300 runs an OSPF instance 800 that maintains its own link state database (LSDB). In an N node network, N LSDBs have to be synchronized. In this traditional architecture, every router in the network executes its own copy of the OSPF instance 800, while in the exemplary SoftRouter architecture, shown in FIG. 10, only the CE executes the OSPF instance 800.

FIG. 9 shows an embodiment of the exemplary SoftRouter architecture where each CE 402 runs an OSPF instance 800 on behalf of multiple FEs 406. In an N node network, there are only N/10 CEs, if each CE manages 10 FEs 406. Thus, only N/10 LSDBs have to be synchronized, yielding faster convergence. The CE executes the OSPF instance 800 remotely, on behalf of the multiples FEs 406 that it controls. The total number of FEs 406 in the exemplary SoftRouter architecture shown in FIG. 10 and the traditional architecture shown in FIG. 8 are the same. However, the total number of CEs 402 is less in the exemplary SoftRouter architecture shown in FIG. 9 than in the traditional architecture shown in FIG. 8. In addition, the total number of OSPF instances 800 across the network is less in the exemplary SoftRouter architecture shown in FIG. 9 than in the traditional architecture shown in FIG. 8.

The OSPF instance 800 manages multiple FEs 406 and computes routes for the entire network. An issue arises in allowing one OSPF instance 800 to manage multiple FEs 406 and that is managing the internal links, i.e., links connecting the FEs 406 that are managed by a single OSPF instance 800. The internal links are shown in FIG. 9 with double lines. Embodiments of the exemplary SoftRouter architecture include three approaches for managing internal links: (1) advertising internal links and weights to other OSPF neighbors, (2) configuring each NE 500 as an OSPF area, resulting in summary advertisements for internal links, or (3) using a separate internal link routing protocol, resulting in no advertisements for internal links.

The first approach is the closest approximation to the traditional distributed OSPF implementation (one OSPF instance per FE 406) in that routes computed are identical to the routes computed using the traditional distributed OSPF. In other words, internal links are treated as identical to the external links. In this first approach, there are still fewer OSPF protocol messages exchanged in the network, because there are fewer OSPF processes as compared to the traditional architecture, resulting in lower message processing overhead.

The second approach tries to match the natural hierarchy inherent in the configuration of OSPF areas to the hierarchy presenting the definition of an NE 500 in the exemplary SoftRouter architecture. In this second approach, each NE 500 is defined as an OSPF area and there is a single OSPF process per area. This results in advertisements of internal links to other OSPF processes in the form of summary advertisements. This second approach results in fewer perturbations in the form of route changes in the entire network due to internal link failures/oscillations. However, this second approach sacrifices the optimal routing present in the current architecture, because routing is not guaranteed to be optimal across OSPF areas. This assumes that there were no OSPF areas configured in the original deployment.

The third approach is the most aggressive optimization among the three approaches. In the third approach, the traditional behavior of maintaining strict boundaries between internal link and external link definitions is retained and internal links are not advertised to OSPF neighbors (for example, internal links may be the backplane/switch fabric in a chassis or very high speed links connecting the FEs 406). In a sense, the third approach closely mimics the strategies employed in building NEs 500. Among the three approaches, the third approach results in the fewest messages exchanged the fewest route changes due to failures, and the fastest convergence times. However, optimal routing is achieved only if the internal links truly have zero cost, as is assumed for the backplane/switch fabric in a traditional router.

Finally, common to all three approaches, is the issue of how OSPF protocol messages are exchanged between the different OSPF protocol instantiations 800 in the exemplary SoftRouter architecture. There are at least two possibilities, either OSPF protocol messages are tunneled from the CE 402 to the FEs 406 so that it appears to all neighbors as though the FE 406 is originating the OSPF protocol messages or OSPF protocol messages are directly exchanged between the CEs 402 themselves. The former option allows for inter-operability of NEs 500 with traditional routers, while the latter option is more efficient as it eliminates duplicate message exchanges (i.e., when two NEs 500 are connected by multiple links) between two CEs 402.

Implementation

Of the three approaches discussed above, the preferred approach is approach three, which has the most aggressive optimization. Further, in order to inter-operate with traditional routers, a strategy is employed for tunneling protocol messages from the CEs 402 to the FEs 406 and then sending them as normal OSPF messages to the FE neighbors. In other words, all control protocol and management messages between the CE 402 and FE 406 are tunneled using a FE/CE transport protocol.

The testbed setup for executing and conducting experiments on the OSPF protocol is the same as shown in FIG. 7. OSPF is started only after the dynamic binding protocol has converged and the initial CE/FE bindings have taken place. As discussed above, one OSPF instance 800 is executed per CE 402, which can control one or more FEs 406. For example, CE3*p* 730 in FIG. 7 is responsible for controlling FE3*a* 736, FE3*b* 738, and FE3*c* 740 and forming a single entity (NE3), while CE4*p* 732 and CE5*p* 734 are responsible for controlling FE4 742 and FE5 744 respectively. From OSPF's perspective, each CE 402 is seen as a node in the network and OSPF adjacencies are established based on the underlying physical FE 406 adjacencies.

Once the OSPF adjacencies have been established and all nodes in the network have converged their link state databases, OSPF runs Dijkstra's shortest path first (SPF) algorithm to determine the routing table. The routing information is injected into the routing table manager (RTM) that aggregates route information from all other routing protocols (e.g., BGP, static) and selects the best possible route for a given destination that needs to be downloaded to the FIB. Because the forwarding engines in the exemplary SoftRouter architecture are located on remote devices, the route entry information is carried from CE 402 to FE 406 using the FE/CE transport protocol on a route-update message. The FE 406 receives the message, downloads the information to its forwarding engine and responds back to the CE 402 about the success of the update. In the case of a failure to update the routes, the CE 402 retries sending this update message again to the FE 406.

Experimental Results and Metrics

Experiments were conducted on the testbed shown in FIG. 7. The performance of the OSPF routing protocol in the exemplary SoftRouter architecture is evaluated and the compared to that in the traditional architecture. All results were calculated by averaging the values from ten experimental runs. Three metrics were evaluated: (1) network convergence time, (2) protocol message count, and (3) route change count. Network convergence times is defined as the tie taken since an event change is detected until all routers in the network have reached steady state with updated routing table entries. The event could be link or node failure or recovery. A lower convergence time indicates a robust network as the network quickly reaches stability after being subjected to change. Event detection is not included as part of this metric, as detection time is common in both architectures and can be optimized by known methods. Protocol message count is defined as the number of OSPF protocol messages processed by the routers in the network following a failure event until the network reaches stability. This is a measure of the spike in processing load as a result of failure. A high message count in a short period of time can result in congestion, leading to dropped packets, timeouts in the protocol state machine, and network instability. Route change count is defined as the number of routes changed in the routers in the network following a failure event until the network reaches stability. Again, a large number of route changes in a short period of time can negatively impact network stability.

Convergence Time

In order to compare the different performance metrics between the traditional router architecture and the exemplary SoftRouter architecture, two cases are evaluated: failure and subsequent recovery for (1) single link and (2) single node (multiple links). In the experiments, the link between FE5a and FE6a was used for the single link failure scenario and node FE6a was used for the single node failure scenario. The same core OSPF implementation and default configuration values were used for comparing the traditional architecture to the exemplary SoftRouter architecture. The SPF hold timer and SPF delay timers play a role in determining the OSPF convergence time, which is time between failure/recovery to steady state. In the exemplary SoftRouter architecture case, the SPF hold time (i.e., the time to wait between consecutive SPF runs) is set to the default value of 10 seconds and the SPF delay time (i.e., the time to wait before running SPF after receiving a database change even) is set to 5 seconds. These timers guarded against routing instability by preventing too frequent SPF calculations.

The average OSPF convergence time after failure/recovery to steady state for the experiments conducted is given in Table 3 below for the traditional architecture and the exemplary SoftRouter architecture. As shown in the table, the results for the exemplary SoftRouter architecture are slightly better than the results for the traditional approach. While the exemplary SoftRouter architecture is generally expected to be better, because the total number of OSPF adjacencies in the exemplary SoftRouter architecture are fewer than in the traditional architecture (due to the ability of the exemplary SoftRouter architecture to aggregate multiple devices to behave as a single NE 500), the difference is small, because the convergence time is dominated by the various OSPF timers involved in link state database synchronization (and also due to the fact that the total reduction in the number of elements is not very large, i.e., only from 11 nodes to 8 nodes).

TABLE 3

Experimental OSPF convergence times (seconds)

| Event | Traditional | SoftRouter |
| --- | --- | --- |
| Link Failure | 5.9 | 5.71 |
| Link Recovery | 15.5 | 14.68 |
| Node Failure | 6.9 | 6.86 |
| Node Recovery | 17.9 | 16.29 |

Message and Route Change Count

The results of the other two performance metrics were compared between the exemplary SoftRouter architecture and the traditional architecture. The total number of OSPF messages was compared to the total number of route updates/changes. When a link or a node fails or recovers (or comes up new), OSPF triggers link update messages that are flooded throughout the network. Once the link state databases on all nodes synchronize and reach steady state, Dijkstra's SPF algorithm is used to calculate the shortest path for each destination and routes are accordingly updated. Table 4 presents the results for the traditional architecture (TR) and the exemplary SoftRouter architecture (SR). Table 4 shows that in both metrics, the exemplary SoftRouter architecture comes out ahead. Again, this is because of the lower number of total nodes and the corresponding adjacencies in the exemplary SoftRouter architecture. Thus, not only did OSPF converge faster, it also flooded fewer messages in the exemplary SoftRouter architecture and caused fewer route changes.

TABLE 4

Testbed experimental results

| Topo. | Event (F) = failure (R) = recovery | # Messages | | Route Changes | |
| --- | --- | --- | --- | --- | --- |
| | | TR | SR | TR | SR |
| Testbed | Link (F) | 177 | 77 | 36 | 14 |
| | Link (R) | 237 | 190 | 29 | 24 |
| | Node (F) | 238 | 80 | 55 | 20 |
| | Node (R) | 555 | 290 | 61 | 29 |

Simulation Results

The impact of failures on these metrics for larger topologies was studied in simulations. A simulator was used to evaluate the optimizations possible in the exemplary SoftRouter architecture. The simulator executed copies of the real software program (ospfd) for each router in the simulated network, thus allowing a high fidelity evaluation using an OSPF implementation that was optimized for the traditional architecture. This simulator was extended in order to evaluate OSPF performance in the exemplary SoftRouter architecture as follows. The forwarding and control planes were separated. The software program was remotely executed on the CE 402. The notion of multiple routers (FEs 406) was introduced in the software program. The notion of external and internal links was also introduced in the software program. A single link state database was maintained was in done in the software program, but modified to allow for unique routing tables for each FE 406 derived by running Dijkstra's SPF algorithm from the perspective of each FE 406. OSPF approaches one and three were simulated to illustrate the range of performance gains in the exemplary SoftRouter architecture as compared to the traditional architecture.

In the evaluation, an N-node ring and full-mesh topologies were considered as well as a typical ISP pop-level topology (20-node, 44 link Tier 1 ISP topology; see FIG. 6). Link propagation delay was set to 10 milliseconds for all links. The three performance metrics were evaluated when these topologies were subjected to changes, such as link or node failure/recovery.

Convergence Time

Results for the convergence time metric after a single link failure were obtained. The SPF delay timer, which determines how often SPF calculations are executed, was set to one second. The performance of the traditional router architecture (TR) was compared with one OSPF process per node to the performance of OSPF optimization approach one in the exemplary SoftRouter architecture (SR). In approach one, both TR and SR resulted in the same number of routing changes and identical routing tables after convergence. A case of one CE 402 and two CEs 402 managing the entire network was considered. Every CE 402 is at most N/10 hops away from all the FEs that it controls. (Sensitivity analysis was also performed on this condition.) The case of one CE 402 managing the entire network implies that no OSPF protocol message exchanges take place. The CE 402, when notified of the link failure event, simply performed all pairs SPF calculations for all FEs 406 and downloaded the updated FIB entries to the FEs 406. While having one CE 402 for the entire network may not be scalable for large networks, it can be very efficient for small to medium sized networks. Further, even though there is one logical CE 402, the CE 402 can be implemented on a rugged multi-blade rack server with hot failovers and high link connectivity, resulting in high availability.

FIG. 10 is a chart showing experimental average convergence time versus the number of nodes in a ring topology. Each data point is an average of convergence time from 100 experiments. In all cases, convergence time generally increased as the number of nodes increased. However, in the traditional architecture, the rate of increase in convergence time is much higher than the rate of increase in the exemplary SoftRouter architecture. This is due to the higher overhead of executing N OSPF processes and consequently higher message processing load in the traditional architecture. Finally, the exemplary SoftRouter architecture instantiation of one CE 402 for the entire network resulted in the lowest convergence time, because there was very little OSPF protocol processing overhead.

Figure 11:
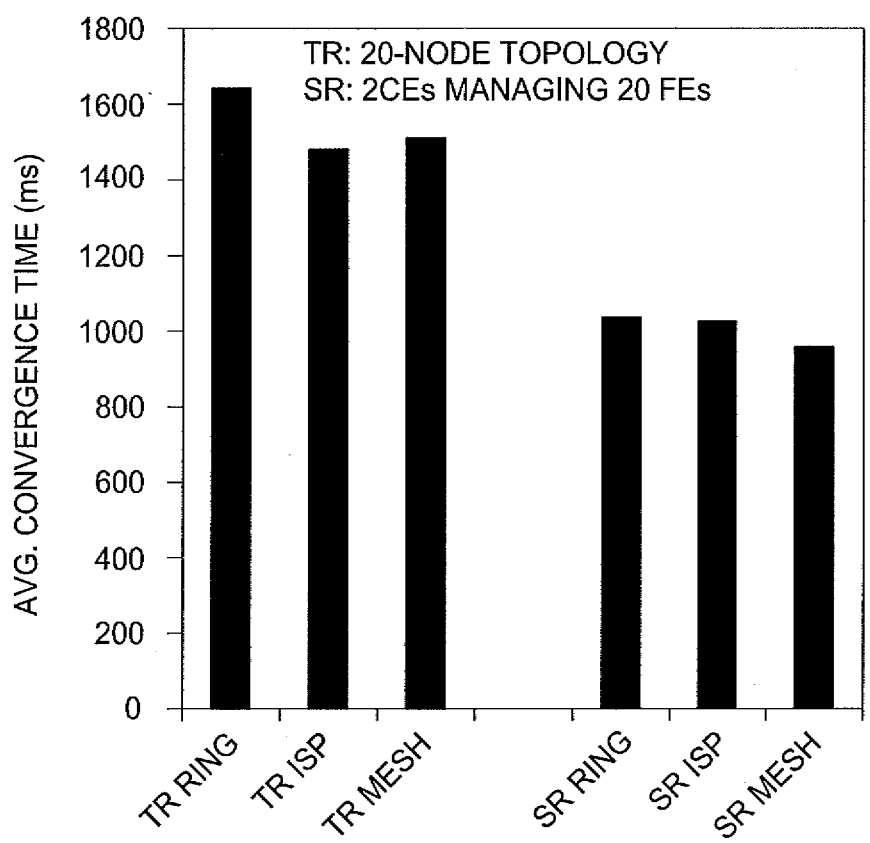
FIG. 11 is a chart showing experimental average convergence time versus different 20-node topologies.

FIG. 11 is a chart showing experimental average convergence time versus different 20-node topologies (i.e., ring, ISP, and mesh). For the traditional architecture, as the node degree increased from ring to ISP, the convergence time improved from 1640 ms to 1481 ms. However, as the topology became a fully connected mesh, convergence time increased slightly (from 1481 ms to 1511 ms). This is due to the load of processing increased OSPF messages that arrived on multiple paths. In the case of the exemplary SoftRouter architecture, convergence time values were lower for all architectures. Furthermore, there is little difference between the convergence time values for the ring and ISP topologies as the worst case distance between the CE 402 and the FE 406 (set to N/10 hops in both cases) determine convergence time.

Figure 12:
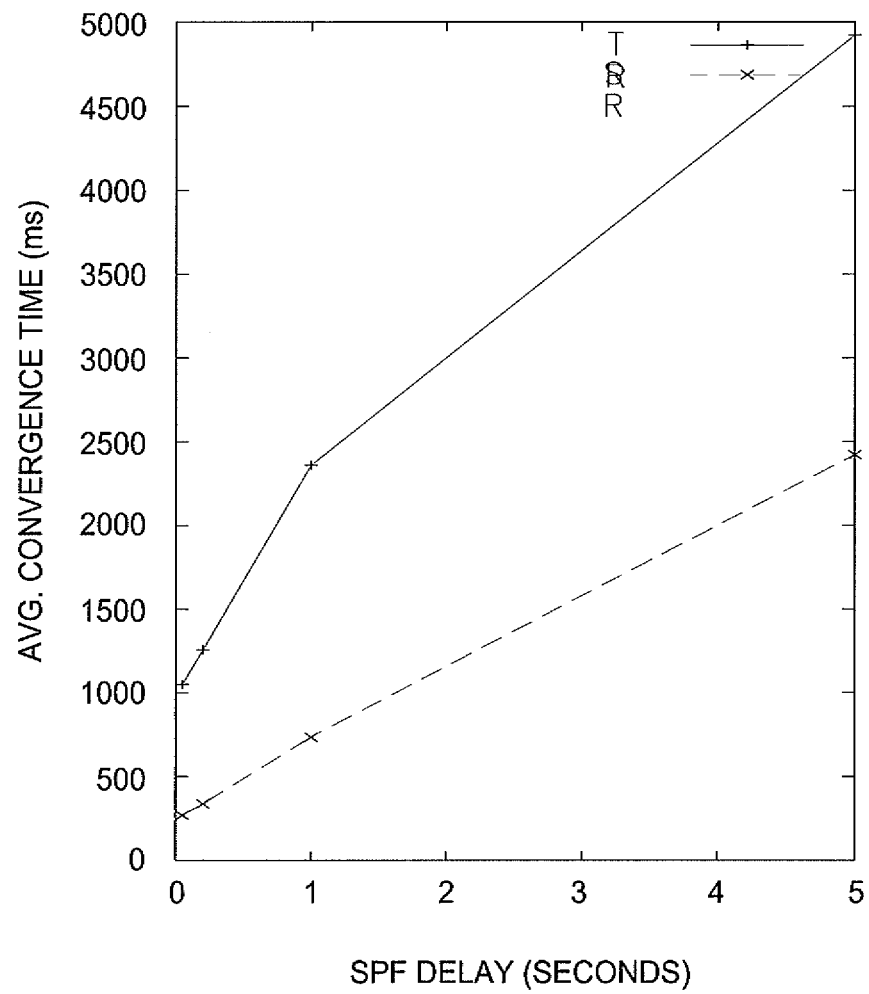
FIG. 12 is a chart showing experimental average convergence time versus the SPF delay timer value for a 100-node ring topology.

FIG. 12 is a chart showing experimental average convergence time versus the SPF delay timer value for a 100-node ring topology. Typical values of SPFdelay in one OSPF vendor implementation is 5 seconds. The SPFdelay timer was varied from 50 milliseconds to 5 seconds in order to determine if convergence time could be aggressively reduced by reducing the SPFdelay timer value. The CE 402 in the exemplary SoftRouter architecture case was at most 10 hops away from every FE 406 and there was one CE 402 managing the entire network. It is clear from FIG. 12 that the SPFdelay timer plays a role in determining convergence time. While SPF calculations are computationally intensive, they still only take on the order of milliseconds. Thus, the SPFdelay values (especially when it is on the order of seconds) and propagation delay (for high diameter networks, such as rings) tended to dominate.

Figure 13:
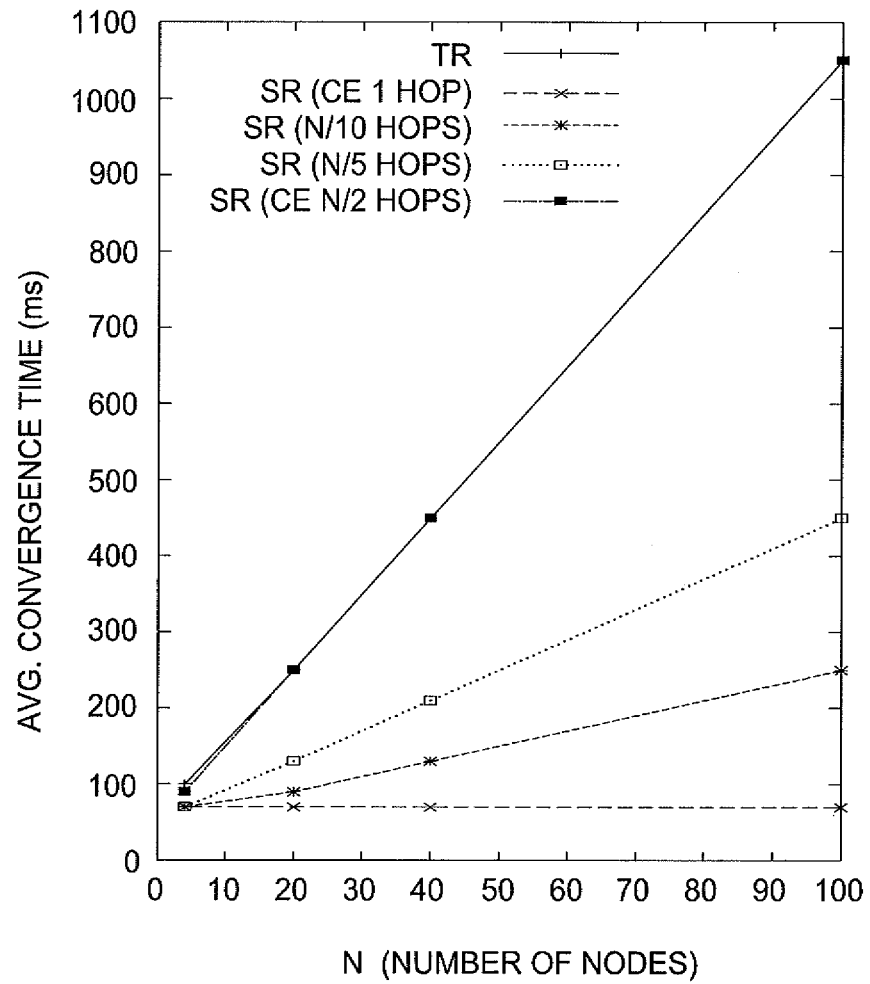
FIG. 13 is a chart showing experimental average convergence time versus the number of nodes in a ring topology.

FIG. 13 is a chart showing experimental average convergence time versus the number of nodes in a ring topology with one CE 402 managing the exemplary SoftRouter architecture. Sensitivity to CE 402 placement was evaluated by varying the worst-case number of hops the CE 402 was away from this FEs 406. Because OSPF computation was performed at the CE 402, messaging latency between the FE 406 and the CEs 402 resulted in high overhead in the exemplary SoftRouter architecture. The SPFdelay timer was set to 50 milliseconds to consider aggressive reduction in convergence time.

The worst case convergence time in the exemplary SoftRouter architecture corresponded to the case where the CE 402 is N/2 hops away from its FE 406 (N/2 is the network diameter for rings). In this case, convergence time in the exemplary SoftRouter architecture and the traditional router architecture were almost the same (the lines are overlapping in FIG. 13). This is because the worst case propagation delay (network diameter) in the traditional router architecture is the same as the worst case propagation delay (CE-FE distance) in the exemplary SoftRouter architecture.

Thus, convergence time after link failure was dominated by propagation delay if the SPFdelay timer was made arbitrarily small. However, because the SPFdelay timer guards against network instabilities, a very small value for the SPFdelay timer is much more likely to cause network instabilities in the traditional router architecture with 100 OSPF processes then in the exemplary SoftRouter architecture with 1-3 OSPF processes.

Figure 14:
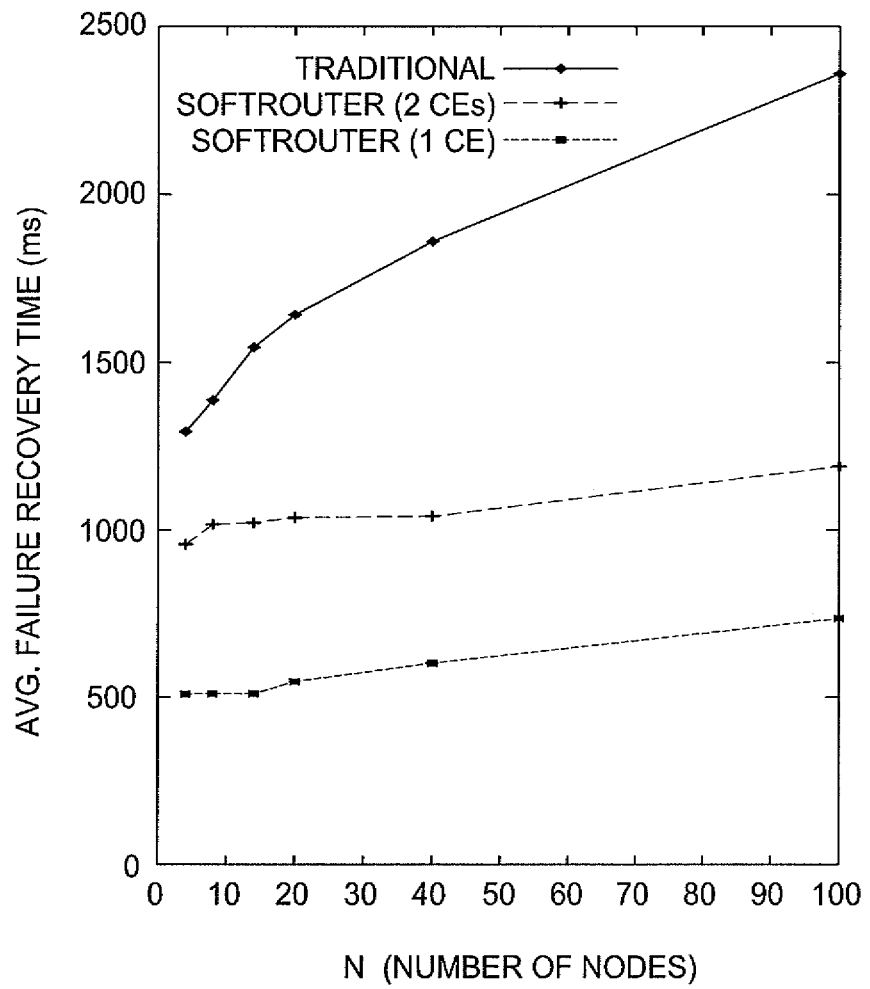
FIG. 14 is a chart showing experimental failure recovery time versus the number of nodes.

FIG. 14 is a chart showing experimental failure recovery time versus the number of nodes. Average failure recovery time in ms is shown on the vertical axis and the number of nodes (0, 10, . . . 100) is shown on the horizontal axis. The data shown in FIG. 7 is from a simulation on an N-node ring network. In this simulation, an event is a single link failure and a shortest path first (SPF) delay timer is set to one second and determines how often SPF calculations are executed. For the exemplary SoftRouter architecture in this simulation, CE is assumed to be at most N/10 hops away from its FEs. There is an order of magnitude fewer OSPF processes in the exemplary SoftRouter architecture, resulting in faster failure recovery. In this simulation, the lowest failure recovery time for the exemplary SoftRouter architecture is one CE/OSPF process that performs routing computations for the entire network.

Figure 15:
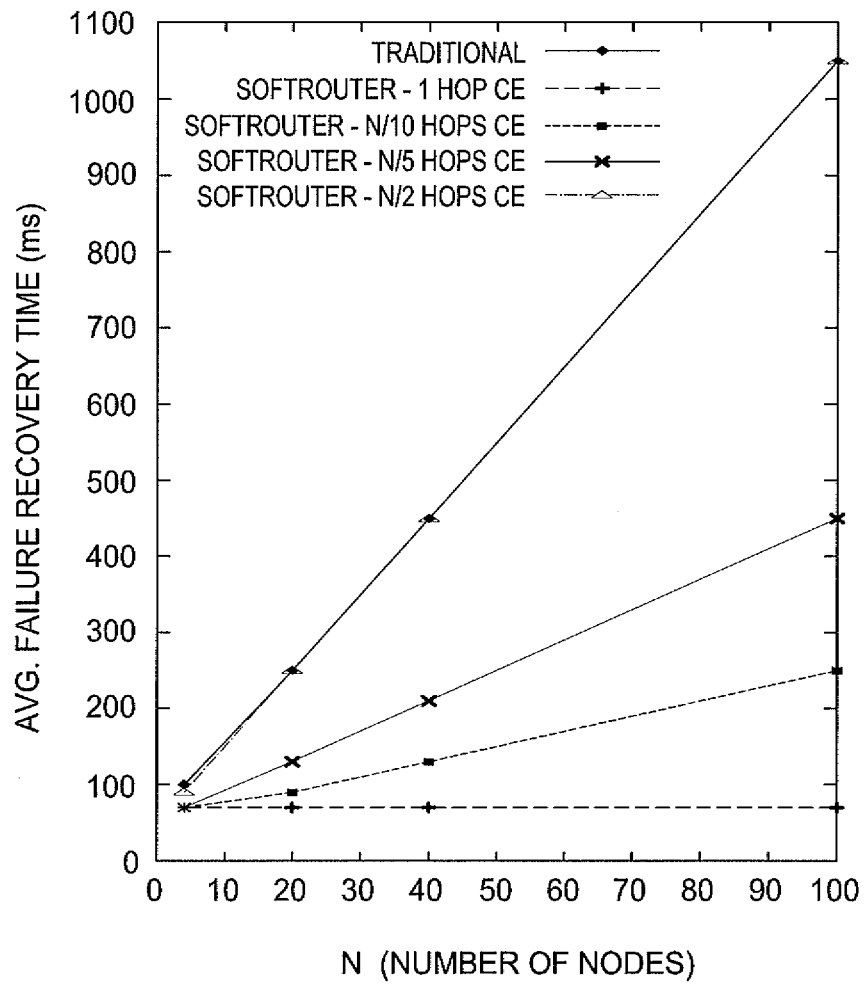
FIG. 15 is a chart showing experimental failure recovery time versus the number of nodes for a shortest path first (SPF) delay time of 50 ms.

FIG. 15 is a chart showing experimental failure recovery time versus the number of nodes for a SPF delay time of 50 ms. While a 50 ms SPF delay timer is realistic for the exemplary SoftRouter architecture with few OSPF instances, this setting could result in network instability in a traditional architecture with hundreds of OSPF instances. The 50 ms failure recovery time is feasible when the exemplary SoftRouter network is managed by one or two primary CE/OSPF processes and the propagation delay from the CE to its FEs is small. It is part of designing embodiments of the exemplary SoftRouter architecture to carefully place CEs.

Message and Route Change Count

A set of experiments were performed using the 20-node ring, mesh, and ISP topologies to determine the number of OSPF messages and route changes that occur following a change in the network. In the case of the exemplary SoftRouter architecture, having one CE 402 manage the entire network would be optimal in terms of messaging overhead as there would be zero protocol messages exchanged. If the network is geographically dispersed, as discussed above, two or three CEs 402 managing the network would reduce the propagation latency between the FEs 406 and the CEs 402, resulting in faster convergence. Thus, conservative results for the case of three CEs 402 managing the exemplary SoftRouter architecture are presented.

The traditional distributed OSPF implementation (TR) was simulated and approaches one and three in the exemplary SoftRouter architecture are identified as SR1 and SR3. SR1 advertises all internal links and, thus, does not reduce the number of route changes as compared to TR; however, SR1 does significantly reduce the number of OSPF messages exchanged as there are fewer OSPF instances 800 in the network. SR3 further optimizes SR1 by not advertising internal links, thus resulting in fewer route changes than SR1.

TABLE 6

Simulation results; legend: L = link, N = node, F = failure, R = recovery

| Top. | Ev. | Messages Total (Max) | | Route Changes Total | |
|---|---|---|---|---|---|
| | | TR | SR1 & SR3 | TR & SR1 | SR3 |
| 20 node ring | L-F | 38 (2) | 4 (2) | 340 | 86 |
| | L-R | 57 (6) | 15 (6) | 340 | 86 |
| | N-F | 110 (6) | 6 (2) | 327 | 88 |
| | N-R | 148 (12) | 25 (9) | 388 | 122 |
| 20 node ISP | L-F | 86 (9) | 20 (9) | 198 | 100 |
| | L-R | 171 (23) | 39 (23) | 198 | 100 |
| | N-F | 553 (64) | 22 (10) | 1095 | 409 |
| | N-R | 1064 (105) | 198 (85) | 1550 | 833 |
| 20 node mesh | L-F | 378 (19) | 262 (96) | 59 | 49 |
| | L-R | 747 (41) | 450 (170) | 59 | 49 |
| | N-F | 6046 (357) | 264 (96) | 380 | 310 |

Table 6 shows the results. First, it was observed that as the network average node degree increased, the number of OSPF messages and route change following a change event increased. Thus, mesh topologies exhibited the highest number of message count and route changes, followed by the ISP topology and, finally, the ring topology.

Second, it was observed that SR1 provides a large reduction in total OSPF messages processed in the network as compared to TR and in the case of ring and ISP topologies, a significant reduction in maximum OSPF messages processed by a single CE 402. The percentage gains in message reduction were highest for ring topologies and lowest for mesh topologies. This was because ring (mesh) topologies have the lowest (highest) number of external links and SR1 established adjacencies on every external link. SR1 could be further optimized by not establishing adjacencies on parallel external links between two NEs 500, resulting in further reduction in messages exchanged.

Third, it was observed that SR1 did not provide any reductions with regards to the route change metric as compared to TR, because SR1 advertises all links in order to achieve identical routing performance as TR. SR3 was able to significantly reduce the number of route changes as compared to TR/SR1, because it did not advertise internal links. If internal inks were high bandwidth links connecting FEs 406 that were close to each other, internal links could be considered as zero-cost links and, thus, SR3 would be suitable for such a network. Again, as before, the percentage reduction in total route changes in the network reduced as the percentage of external links increased from ring to mesh topologies.

Finally, the results for the ISP topology were considered. SR1 was able to reduce the total number of messages processed following a node failure from 553 to 22 and maximum number of messages processed by any node from 64 to 10 (an 84% reduction). In traditional router architecture, every node in the ISP topology must be able to process the maximum message count in a short amount of time following failures. In contrast, CEs 402 in the exemplary SoftRouter architecture are servers with the fastest processors and process fewer messages than traditional router architectures with slower control processors. Further, with SR3, the number of route changes in the network was also reduced from 1095 to 409. Thus, the exemplary SoftRouter architecture using approach SR1/SR3 is better equipped to handle overload scenarios as a result of network failures, resulting in better network stability.

Results Summary

OSPF convergence following failures is quite efficient in current distributed network due to its reliable flooding mechanism. A dominant portion of convergence time in current networks is due to the SPFdelay timer. While default SPFdelay timer values of 5 seconds are necessary to reduce network instabilities in current networks with hundred of OSPF processes, OSPF optimization in the exemplary SoftRouter architecture helps drive down convergence times to about 10 ms or less by being aggressive with SPFdelay timer setting, because only two or three OSPF processes are necessary to manage the entire network. Finally, the latency between CE 402 and FE 406 in the exemplary SoftRouter architecture plays a role in convergence time and, thus, careful planning as discussed above helps in placing CEs 402 close to their FEs 406.

OSPF optimization in the exemplary SoftRouter architecture has a more dramatic impact in reduction of overload due to message processing and route changes as compared to current networks. By allowing fewer OSPF processes to manage all the routers in the network, the message count can be reduced by up to about 80%, even for the case of three CEs 402 managing the network. Message count reduction would be 100% for the one CE 402 case. Further, if internal links of an NE 500 are not advertised in OSPF messages, the number of route changes can also be significantly reduced. Thus, network stability, as measured by convergence time, message count, and route changes, can be significantly improved in embodiments of the exemplary SoftRouter architecture by having fewer CEs 402 manage all the FEs 406 in the network.

Inter-domain Routing

Inter-domain routing protocols, specifically BGP, are deployed in the exemplary SoftRouter architecture, resulting in many benefits.

Figure 16:
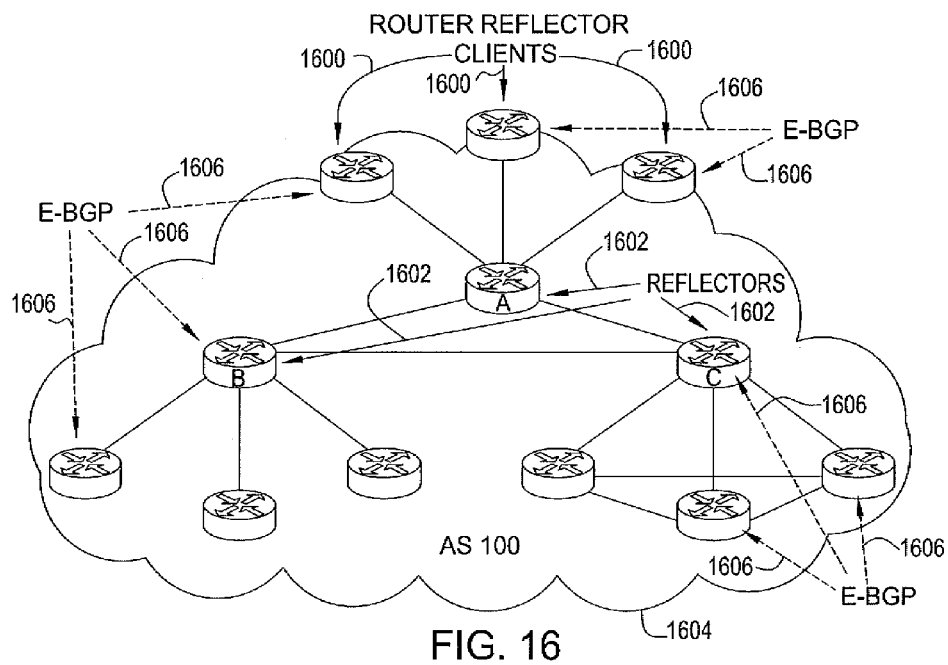
FIG. 16 is a block diagram showing a prior art network with route reflectors.

FIG. 16 shows a prior art network with route reflectors. This network is a typical deployment of BGP with route reflectors. There are several route reflector clients 1600 and reflectors 1602 in the large AS network 1604 that uses external BGP (E-BGP) 1606. This deployment has two main drawbacks. Specifically, under certain conditions, the network 1604 can go into persistent route oscillation where a subset of router may exchange routing information without ever reaching a stable routing state. Another issue with the route reflector architecture is internal BGP (I-BGP) reliability. While the failure of one I-BGP session affects only two routers in the case of a full mesh I-BGP architecture, the same failure of a session between two route reflectors 1602 could partition the network 1604, resulting in significantly lower reliability.

Figure 17:
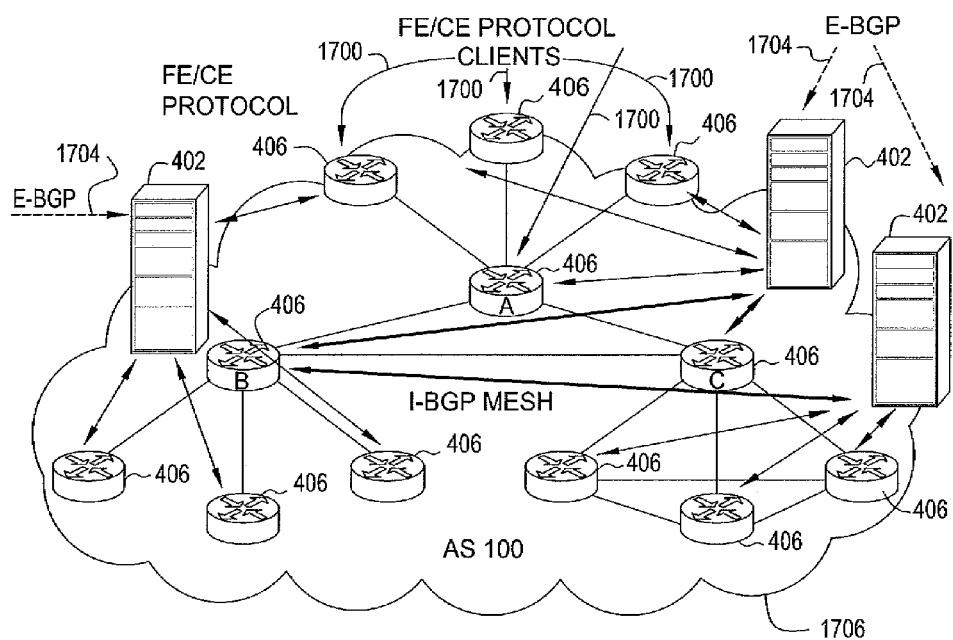
FIG. 17 is a block diagram showing an embodiment of the exemplary SoftRouter architecture.

FIG. 17 shows an embodiment of the exemplary SoftRouter architecture. There are FE/CE protocol clients 1700, an I-BGP mesh 1702, and less E-BGP 1704 communication in a BGP AS network 1706. FIG. 17 has a full I-BGP mesh 1702 that can be maintained among the CEs 402. This eliminates network instability that is possible using route reflectors 1600 as in the prior art BGP AS network 1604 shown in FIG. 16. CEs 402 can employ 1:N redundancy to increase reliability. FEs 406 need only run a simple FE/CE protocol. In the case of BGP deployment in the exemplary SoftRouter architecture, the number of CEs 402 that run BGP is typically at least on order of magnitude smaller than the number of routers. Thus, a full I-BGP mesh can easily be maintained among the CEs 402. The CEs 402 download the appropriate forwarding tables to all the FEs 406 using a standard protocol. Thus, the persistent route oscillation problem is trivially solved in the exemplary SoftRouter architecture (because there are no route reflectors), thereby increasing network availability. Further, in the exemplary SoftRouter architecture, the I-BGP mesh is between servers that employ a higher degree of redundancy, such as 1:N (N>1) as compared to 1:1 redundancy on the control processors of the routers. Thus, BGP stability and reliability can be significantly improved in the exemplary SoftRouter architecture, assuming that the CEs 402 are multi-homed and that there are multiple CEs 402 in the network for failover. In the implementation of BGP in the exemplary SoftRouter architecture, a standard protocol is used to communicate with the FEs 406 rather than IGP and I-BGP, which simplifies the software on the FEs 406, and I-BGP mesh is used between the CE 402 servers inside a single AS.

Exemplary embodiments of the SoftRouter architecture overcome many technical challenges, such as protocol aggregation, network design, and the bootstrapping paradox. It was determined how protocols like OSPF/BGP operate when a single protocol instantiation at a CE 402 manages multiple FEs 406. For OSPF, preliminary results indicate about a 50 ms failure recovery time is feasible when an exemplary SoftRouter network is managed by one or two primary CE/OSPF processes and the propagation delay from a CE 402 to its FEs 406 is small. For BGP, a full BGP-mesh can be maintained among a few CEs 406, eliminating the network instability that is possible under the route reflector architecture. It was determined how to place CEs 402 in a network design and which CEs 402 should manage which FEs 406. An exemplary method based on recursive graph bisection identifies where to place CEs 402 and which set of FEs 406 each CE 402 should manage. The bootstrapping paradox, (i.e., the FE 406 needs updated forwarding tables in order to route packets to its CE 402, but only the CE 402 can update the forwarding tables) was solved by an exemplary discovery protocol to break the circularity. This protocol allows each FE 406 to bind to its CE 402 and provides simple routing capability between them.

One exemplary application of the exemplary SoftRouter architecture is adding differentiating features to Ethernet. Metro Ethernet deployments are expanding rapidly. Virtual path links (VPLs) are a key feature in wide-area deployment, but it is a departure from pure Ethernet switching. There is a need for MPLS forwarding hardware and an IP control plane. New chips integrate forwarding support. The control plane needs for VPLs include Ethernet switches to run complex software. An embodiment of the exemplary SoftRouter architecture includes CEs 402 that simplify networks by not requiring complex IP software on every Ethernet switch. Enabling customized path computation allows CEs 402 with differentiating features.

Another exemplary application of the exemplary SoftRouter architecture is consolidating routing in a POP. The overall costs for a POP can be significantly reduced using the SoftRouter architecture, because it uses commodity hardware rather than specialized hardware, standards based FEs 406 by multiple vendors, and has pricing power similar to Ethernet versus router interfaces. Open source based routing software leverages development distributed among a large community of contributors. There are fewer controllers needed. A POP with 15 routers has 30 controllers (1:1 redundancy) today, while a SoftRouter network only requires about two to four CEs 402.

Figure 18:
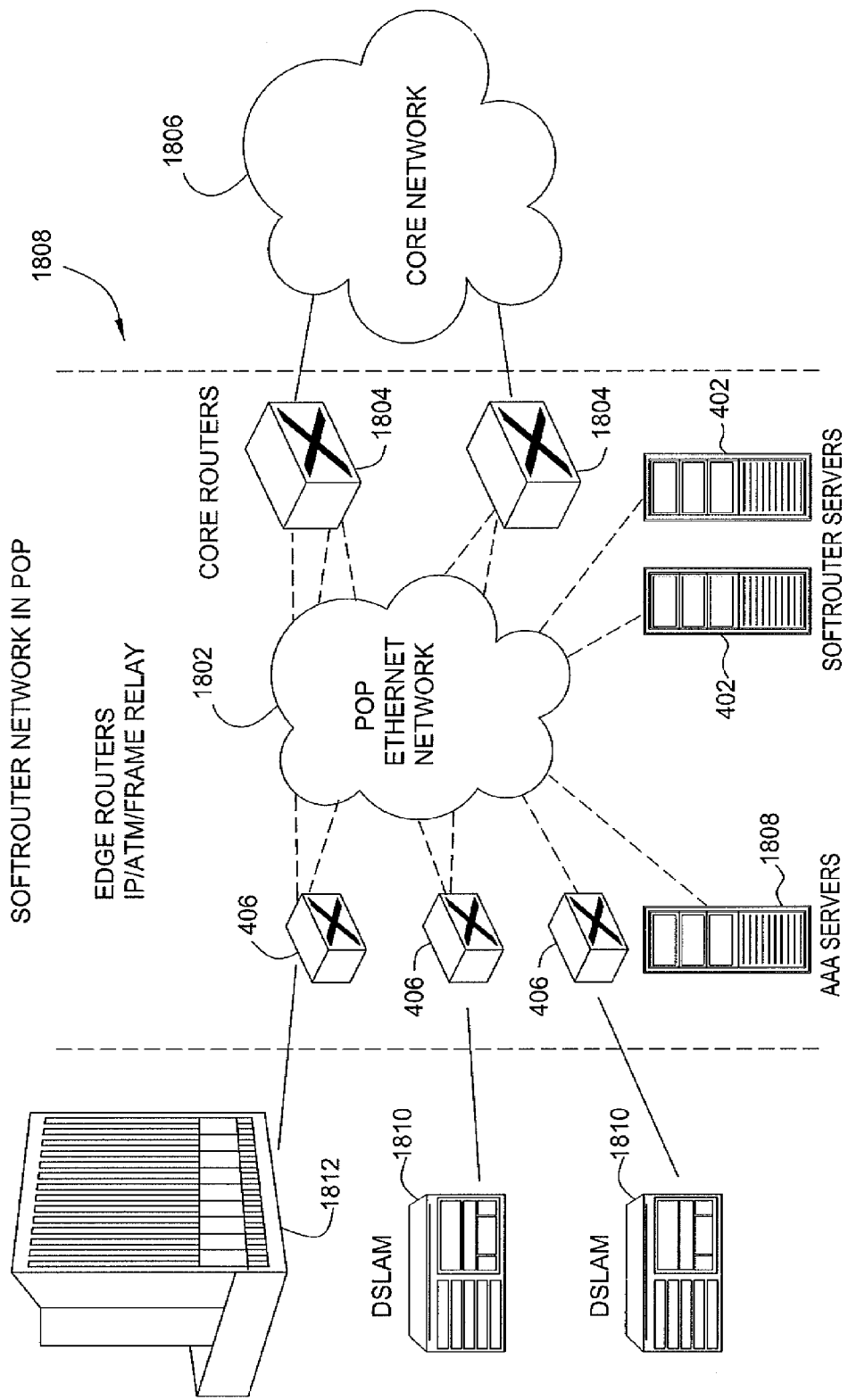
FIG. 18 is a block diagram showing a consolidating routing in a point-of-presence (POP) according to an embodiment of the exemplary SoftRouter architecture.

FIG. 18 shows a consolidating routing in a point-of-presence (POP) according to an embodiment of the exemplary SoftRouter architecture. Yet another exemplary application of the exemplary SoftRouter architecture is consolidating routing in a POP. A POP Ethernet network 1802 is connected by core routers 1804 to a core network 1806. The POP Ethernet network 1802 is also connected to SoftRouter servers (CEs) 402, authentication, authorization, and accounting (AAA) servers 1808. Digital subscriber line access multiplexers (DSLAMs) 1810 and edge routers 1812 (e.g., IP/ATM/FrameRelay) are connected to FEs 406, which are connected to the POP Ethernet network 1802. The overall costs for a POP can be reduced using SoftRouter, because it uses commodity hardware rather than specialized hardware, standards based FEs 4506 by multiple vendors, and has pricing power similar to Ethernet versus router interfaces. Open source based routing software leverages development distributed among a large community of contributors. There are fewer controllers needed. A POP with 15 routers has 30 controllers (1:1 redundancy) today, while a SoftRouter network only requires about two to four CEs 402.

In summary, router networks are becoming increasingly complex. Emerging applications and performance requirements are driving more functions to IP. Incorporating too many IP functions in routers results in duplication of complex functions in multiple routers of a network. Disaggregation of router hardware from software in an exemplary SoftRouter architecture addresses this problem and has the potential for major additional advantages. In an exemplary SoftRouter architecture router control and transport planes are disaggregated so that the transport plane includes packet forwarding elements and the control plane includes control element servers and feature servers. The control plane and transport plane communicate using standard protocols. Some benefits of this concept include the centralization of complex functions, lower costs, faster and less expensive introduction of new applications, resulting from open APIs and incremental deployment, and increased scalability, reliability, and security, among other benefits.

Figure 19:
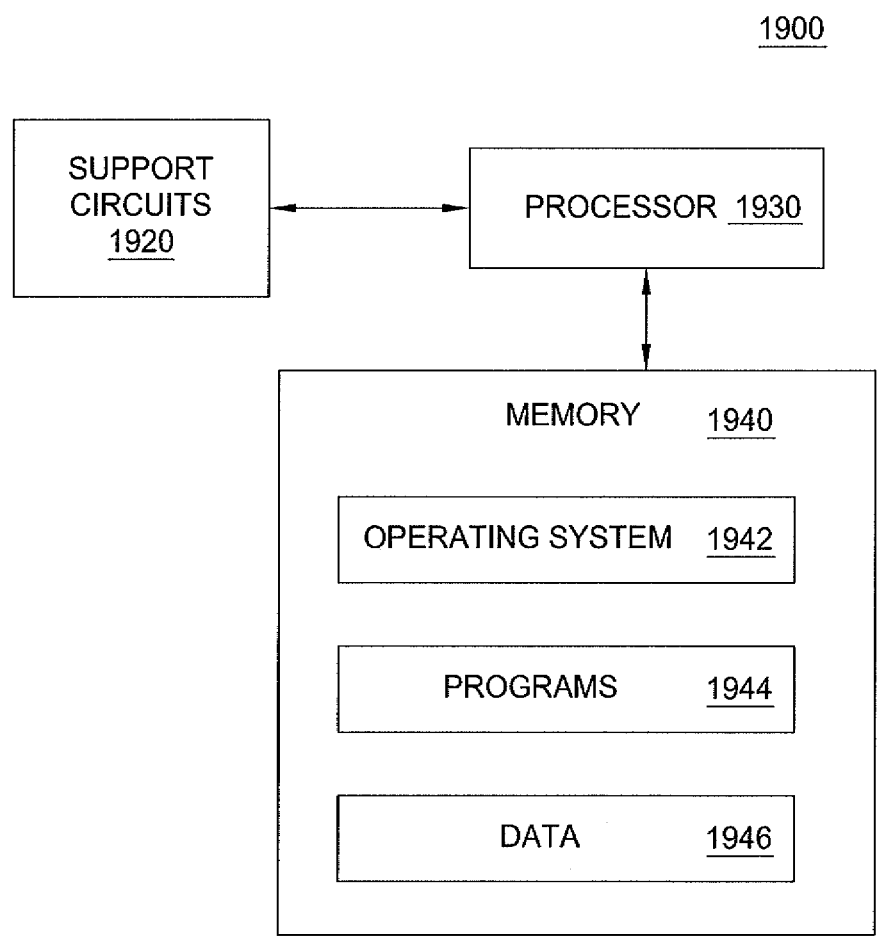
FIG. 19 is a block diagram showing an embodiment of a SoftRouter network in POP.

FIG. 19 is a high level block diagram showing a computer. The computer 1900 may be employed to implement embodiments of the present invention. The computer 1900 comprises a processor 1930 as well as memory 1940 for storing various programs 1944 and data 1946. The memory 1940 may also store an operating system 1942 supporting the programs 1944.

The processor 1930 cooperates with conventional support circuitry such as power supplies, clock circuits, cache memory and the like as well as circuits that assist in executing the software routines stored in the memory 1940. As such, it is contemplated that some of the steps discussed herein as software methods may be implemented within hardware, for example, as circuitry that cooperates with the processor 1930 to perform various method steps. The computer 1900 also contains input/output (I/O) circuitry that forms an interface between the various functional elements communicating with the computer 1900.

Although the computer 1900 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The present invention has many benefits for customers, including lower costs, new revenue opportunities, better scalability, added reliability, and increased security. Lower costs come from commoditized, standards-based hardware with a lower capital expense and dedicated control plane servers, implying fewer management points and a lower operational expense. There are new revenue opportunities, because network-based applications to support new services that are more easily added using open application programming interfaces (APIs) and incremental deployment is made simpler through centralized management. There is better scalability, because centralized control plane servers are easier to scale using well-established server scaling techniques. There is added reliability, because forwarding elements are more robust due to reduced software and other reliability enhancing mechanisms, (e.g., failover and overload control) that are easier to implement in the server-based control plane. There is increased security, because the centralized control plane servers are easier to secure using perimeter defense systems, e.g., firewalls.

There are lower capital expenses and operating expenses. The exemplary SoftRouter architecture decouples the innovation curve of the control and forwarding elements. Hardware vendors can focus on higher speed and density. New software vendors can enter the market and focus on applications and easier manageability. More competing players should yield lower prices. The CEs are made up of lower cost generic computing blades rather than expensive router control boards. Control servers are shared by many routers resulting in better efficiency. Having CEs leverages the central processing unit (CPU) price-performance curve of server platforms. FEs are mostly hardware-based and require little management, similar to layer 2 devices. Fewer control plane servers means fewer management points. There is a reduced possibility of misconfiguration.

The exemplary SoftRouter architecture is designed to be more reliable than a traditional network. FE software is an order of magnitude simpler than CE software, making FEs more robust. Strategic placement of CEs and failover between these elements allow a network to handle a pre-specified number of failures, except in severe network partitions where an island of forwarding elements are stranded without connectivity to a CE.

There are fewer points of control, resulting in faster router convergence and better network stability. There are fewer OSPF link-state databases to synchronize after a failure. Convergence is faster assuming failure detection times are unchanged. Full-mesh I-BGP between these servers is feasible. Some network instability problems with respect to the BGP route reflector architecture can be eliminated.

Security is improved in the exemplary SoftRouter architecture compared to the traditional model. Specialized router operating systems (OS) are not as widely tested as open source control software, such as Linux. Attacks on router OS have been increasing recently. Multiple control blades are better than one or two control blades. An overload due to malicious traffic can be distributed across a large number of control blades in the server in the exemplary SoftRouter architecture. Sophisticated statistical analysis can also be performed in the multiple blade SoftRouter servers for intrusion detection. A separate firewall protecting control blades is better than none. Fewer control plane servers in embodiments of the exemplary SoftRouter architecture make it easier to secure using dedicated firewalls. A separate signaling network is better than a shared signaling network. Embodiments of the exemplary SoftRouter architecture allows for the possibility of a separate signaling network connecting the control servers.

Deconstructing routers into forwarding and control elements is the basis for embodiments of the exemplary SoftRouter architecture described above. Forwarding elements perform mostly repetitive hardware intensive packet handling tasks, such as packet filtering, longest prefix matches on the IP packet header, traffic management, and switching. These forwarding elements transport all the traffic and are distributed throughout the network. Control elements, which are few and located at strategic locations in the network, embody all the control logic of current routers. Consequently, they are much more software intensive and complex than forwarding elements. A traditional router consists of a set of forwarding elements collocated with (statically associated with) at most two control elements. The present invention introduces a new paradigm where the control element can be multiple network hops away from a particular forwarding element and the binding between forwarding and control elements is dynamic. Embodiments of the exemplary SoftRouter architecture have many technical benefits, including improved stability and increased reliability. Simulations and results from a testbed quantified these benefits. An architecture where a few control elements perform route computations for a large number of forwarding elements has the potential to not only simply routers, but also provide easier access to a network-wide view of the control plane state.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for using a dynamic binding protocol to discover a first CE in a network of devices including at least a first forwarding element (FE), a first control element (CE) and a first network element (NE), the first control element (CE) for controlling a first FE set, the first CE providing one first protocol process among a plurality of protocols on behalf of each FE in the first FE set, the first CE being physically remote from the FEs in the first FE set, the first CE being dynamically bound to each FE in the first FE set such that multiple bindings may be performed, the method comprising:

performing, by one of the FEs of the first FE set, a dynamic binding protocol for dynamically binding the FE to one of the CEs, wherein the dynamic binding protocol comprises a discovery protocol enabling the FE to discover one or more of the CEs which can manage the FE such that multiple bindings may be performed; and configuring the FE to use the dynamic binding protocol to request discovery of the first CE, wherein said first CE is configured to respond to the respective requests for discovery of the first CE by the FE in the first FE set, wherein respective responses by the first CE to discovery of the first CE by the FE in the first FE set are configured for use by the FEs in the first FE set to dynamically bind with the first CE, wherein the first CE and the FEs in the first FE set form a first network element (NE).

2. The method of claim 1, wherein the dynamic binding protocol handles failovers.

3. The method of claim 1, further comprising:
broadcasting, by the FE a solicitation message toward each of neighbor elements of the FE;
receiving, from a neighbor CE, an advertisement for enabling the neighbor CE to advertise its identity to the FE;
receiving a solicitation message from the neighbor FE; and
propagating, from the FE toward the neighbor FE responsive to the solicitation message received from the neighbor FE, reachability information comprising reachability information for the neighbor CE.

4. The method of claim 1, wherein the reachability information for the neighbor CE comprises an identifier of the neighbor CE and a source route to reach the neighbor CE.

5. The method of claim 1, wherein the reachability information comprises reachability information for all CEs already learned by the FE.

6. The method of claim 1, further comprising:
adding an identifier of the neighbor CE to a list of received source routes maintained on the target FE, in response to receiving the advertisement from the neighbor CE; and
adding an identifier of the neighbor FE to a list of received source routes maintained on the target FE, in response to receiving the solicitation message from the neighbor FE.

7. The method of claim 1, wherein the FE has a primary CE and a backup CE associated therewith, wherein the FE maintains an active association with the primary CE and maintains an active association with its backup CE.

8. The method of claim 1, wherein the FE discovers a plurality of CEs, wherein the discovered CEs include the CE neighbor of the FE and at least one additional CE, the method further comprising:
selecting, by the FE, one of the discovered CEs as a managing CE for the FE; and
propagating, from the FE toward the selected one of the discovered CEs, an association message requesting an association between the FE and selected one of the discovered CEs.

9. The method of claim 8, wherein a first routing protocol process manages the FEs of the first NE and computes intra-domain routes for the FEs of the first NE.

10. The method of claim 9, further comprising internal links and weights of the internal links that are advertised to neighbors.

11. The method of claim 8, further comprising:
receiving, at the FE, a response from the selected one of the discovered CEs indicating acceptance of the request for an association between the FE and the selected one of the discovered CEs; and
maintaining, by the FE, the association between the FE and the selected one of the discovered CEs.

12. The method of claim 8, further comprising:
receiving, at the FE, a response from the selected one of the discovered CEs indicating rejection of the request for an association between the FE and the selected one of the discovered CEs;
wherein the response from the selected one of the discovered CEs comprises an identifier of a primary CE assigned to the FE and an identifier of a backup CE assigned to the FE.

* * * * *